US007644375B1

(12) United States Patent  (10) Patent No.: US 7,644,375 B1
Anderson et al.  (45) Date of Patent: Jan. 5, 2010

(54) DYNAMIC PATH FLOW REPORTS

(75) Inventors: Joel Anderson, American Fork, UT (US); David Stair, Midvale, UT (US); Catherine Jen Wong, Provo, UT (US)

(73) Assignee: Adobe Systems Incorporated, San Jose, CA (US)

( * ) Notice: Subject to any disclaimer, the term of this patent is extended or adjusted under 35 U.S.C. 154(b) by 316 days.

(21) Appl. No.: 11/523,783

(22) Filed: Sep. 18, 2006

(51) Int. Cl.
*G06F 3/048* (2006.01)
(52) U.S. Cl. .................. 715/853; 715/733; 715/734; 715/735; 715/736; 709/224; 709/225; 702/182
(58) Field of Classification Search ......... 715/853–855, 715/738, 733–736, 760; 702/182; 707/5, 707/10, 102, 104.1; 709/203, 219, 224–225, 709/227, 230, 238, 242, 250
See application file for complete search history.

(56) References Cited

U.S. PATENT DOCUMENTS

| | | | |
|---|---|---|---|
| 5,760,772 | A | 6/1998 | Austin |
| 5,796,402 | A | 8/1998 | Ellison-Taylor |
| 5,821,931 | A | 10/1998 | Berquist et al. |
| 5,835,087 | A | 11/1998 | Herz et al. |
| 5,870,559 | A | 2/1999 | Leshem et al. |
| 5,966,139 | A | 10/1999 | Anupam et al. |
| 6,008,809 | A | 12/1999 | Brooks |
| 6,026,397 | A | 2/2000 | Sheppard |
| 6,182,097 | B1 | 1/2001 | Hansen et al. |
| 6,188,405 | B1 | 2/2001 | Czerwinski et al. |
| 6,266,649 | B1 | 7/2001 | Linden et al. |
| 6,310,631 | B1 | 10/2001 | Cecco et al. |
| 6,393,479 | B1 | 5/2002 | Glommen et al. |
| 6,414,677 | B1 | 7/2002 | Robertson et al. |
| 6,473,102 | B1 | 10/2002 | Rodden et al. |
| 6,489,968 | B1 | 12/2002 | Ortega et al. |
| 6,654,036 | B1 | 11/2003 | Jones |
| 6,671,711 | B1 | 12/2003 | Pirolli et al. |
| 6,704,016 | B1 | 3/2004 | Oliver et al. |
| 6,754,873 | B1 | 6/2004 | Law et al. |
| 6,766,370 | B2 | 7/2004 | Glommen et al. |
| 6,850,988 | B1 | 2/2005 | Reed |
| 6,862,574 | B1 | 3/2005 | Srikant et al. |

(Continued)

FOREIGN PATENT DOCUMENTS

WO    WO 00/58866 A    10/2000

(Continued)

OTHER PUBLICATIONS

U.S. Appl. No. 10/113,808, filed Mar. 29, 2002, Wiles, Jr.

(Continued)

*Primary Examiner*—Weilun Lo
*Assistant Examiner*—Rashedul Hassan
(74) *Attorney, Agent, or Firm*—Raubvogel Law Office

(57) ABSTRACT

A report shows website visitation statistics including page visits before and after a path that can include one or more pages. The report responds to user selection of a page by adding the selected page to the path and regenerating the report. The user can click on pages to add them to the path, or to replace existing pages in the path. The user can also request and receive additional information about any page represented in the report.

27 Claims, 20 Drawing Sheets

U.S. PATENT DOCUMENTS

| | | | |
|---|---|---|---|
| 6,950,993 | B2 | 9/2005 | Breinberg |
| 6,963,874 | B2 | 11/2005 | Kasriel et al. |
| 6,968,511 | B1 | 11/2005 | Robertson et al. |
| 6,980,962 | B1 | 12/2005 | Arganbright et al. |
| 2002/0040395 | A1 | 4/2002 | Davis et al. |
| 2002/0042750 | A1 | 4/2002 | Morrison |
| 2002/0087621 | A1 | 7/2002 | Hendriks |
| 2002/0091591 | A1 | 7/2002 | Tsumura et al. |
| 2002/0093529 | A1 | 7/2002 | Daoud et al. |
| 2002/0099812 | A1 | 7/2002 | Davis et al. |
| 2002/0152284 | A1 | 10/2002 | Cambray et al. |
| 2002/0165936 | A1 | 11/2002 | Alston et al. |
| 2002/0186237 | A1* | 12/2002 | Bradley et al. ............. 345/736 |
| 2002/0186253 | A1 | 12/2002 | Rodden et al. |
| 2002/0198939 | A1 | 12/2002 | Lee et al. |
| 2003/0023712 | A1 | 1/2003 | Zhao et al. |
| 2003/0025737 | A1 | 2/2003 | Breinberg |
| 2003/0055883 | A1 | 3/2003 | Wiles, Jr. |
| 2003/0128231 | A1* | 7/2003 | Kasriel et al. ............. 345/736 |
| 2003/0131097 | A1* | 7/2003 | Kasriel et al. ............. 709/224 |
| 2004/0049417 | A1 | 3/2004 | Nickerson et al. |
| 2004/0133671 | A1 | 7/2004 | Taniguchi |
| 2004/0205157 | A1 | 10/2004 | Bibelnieks et al. |
| 2004/0260807 | A1* | 12/2004 | Glommen et al. .......... 709/224 |
| 2005/0044508 | A1 | 2/2005 | Stockton |
| 2005/0204307 | A1 | 9/2005 | Nadal |
| 2005/0229110 | A1 | 10/2005 | Gegner et al. |
| 2005/0235222 | A1 | 10/2005 | Barbanson et al. |
| 2005/0273727 | A1 | 12/2005 | Barbanson et al. |
| 2006/0149728 | A1* | 7/2006 | Error et al. ..................... 707/5 |

FOREIGN PATENT DOCUMENTS

| WO | WO 02/23438 A2 | 3/2002 |
|---|---|---|

OTHER PUBLICATIONS

U.S. Appl. No. 10/113,322, filed Mar. 29, 2002, Zhao et al.
U.S. Appl. No. 10/057,513, filed Jan. 25, 2002, Alston et al.
U.S. Appl. No. 09/835,112, filed Apr. 13, 2001, Cambray et al.
Hong, J. et al., "What Did They Do? Understanding Clickstreams with the WebQuilt Visualization System," WebQuilt homepage http://guir.berkeley.edu/projects/webquilt/, pp. 1-7.
Hong, J. et al., "WebQuilt: A Framework for Capturing and Visualizing the Web Experience," WebQuilt, homepage: http://guir.berkeley.edu/projects/webquilt/, May 1-5, 2001, pp. 1-8.
Notification of International Search Report and Written Opinion, PCT/US04/39253, Dec. 13, 2005, 13 pages.
Notification of International Search Report and Written Opinion, PCT/US04/06898, Feb. 9, 2005, 8 pages.
Notification of International Search Report and Written Opinion, PCT/US04/06696, Feb. 28, 2005, 9 pages.
Supplementary European Search Report, EP 04717485, Nov. 7, 2006, 3 pages.

* cited by examiner

DYNAMIC PATH FLOW REPORTS

CROSS-REFERENCE TO RELATED APPLICATIONS

This application is related to U.S. patent application Ser. No. 10/609,008, filed Jun. 27, 2003, for CAPTURING AND PRESENTING SITE VISITATION PATH DATA, the disclosure of which is incorporated herein by reference.

FIELD OF THE INVENTION

The present invention is related to display of website visitation statistics, and more particularly to a dynamic report that allows a user to see and traverse a website visitation path flow.

DESCRIPTION OF THE BACKGROUND ART

It is useful for website operators to be able to discern patterns of visitation to their websites. Website operators, advertisers, and other parties are interested in finding out which web pages within their websites tend to be visited more or less frequently than others. Such information has many uses, including for example: identifying problem areas in a website, pages that tend to lose visitors to other websites, traffic flow for advertising and server load purposes, and the like.

Of particular use are statistics describing the visitation path flow that visitors tend to follow. Such statistics include for example, information describing where the visitors tend to enter the site, what pages do they tend to visit first, what pages tend to be visited just after or before other pages, and the like.

Existing web analytics software generally provides some statistics as to site visitation path flow. In general, such techniques include presentation of static reports describing the percentage of visitors that follow particular path flows.

What is needed is a dynamic display that would allow a user to traverse a chosen path flow and to see what web pages tend to be visited before and after any page along the path flow. What is further needed is a user interface for providing such a dynamic path flow display in an easy-to-use and intuitive manner. What is further needed is a system for generating printed website visitation reports based on the dynamic path flow display.

SUMMARY OF THE INVENTION

A dynamic path flow display is presented in the form of an on-screen report. A user can interact with the on-screen report to see website visitation statistics. If desired, the report can be printed.

The user can select any web page as a starting point for the report. This starting page forms an initial path being analyzed. A previous column shows pages visited prior to the path, and a next column shows pages visited after the path. Statistics for each page are shown, including the number of visitors that traversed the path and also visited a particular previous or next web page (referred to as "path views"), as well as a percentage of visitors that traversed the path and also visited a particular previous or next web page.

The various pages are presented as clickable links. The user can click on any of the displayed links to explore additional paths in either the previous or next direction, by adding the selected pages to the path being analyzed (or by designating the selected page as a new path). In this manner, the user can either select a new starting point and see pages visited prior to and after the selected page, or expand on the path being analyzed. In either case, the dynamic report is updated following the user's input, to shows statistics for pages visited before and after the specified path.

The report can also provide additional information about any page represented therein. For example, hovering over a link can cause such additional information to appear, including for example average time spent on a page, last modified date for a page, thumbnail image of page, and the like.

The user can also request a printout of the displayed report.

The Figures depict a preferred embodiment of the present invention for purposes of illustration only. One skilled in the art will readily recognize from the following discussion that alternative embodiments of the structures and methods illustrated herein may be employed without departing from the principles of the invention described herein.

DESCRIPTION OF AN EMBODIMENT OF THE INVENTION

The present invention is a system and method for generating a user interface for a web analytics tool that includes a dynamic path flow display. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Furthermore, the present invention is described below primarily in the context of web analytics data; however that is only by way of example, for convenience and ease of understanding of the concepts of the present invention. Those skilled in the art will recognize that the present invention is not limited to web analytics data but may also be used for any other type of data including but not limited to marketing data, sales data, application usage data, hardware usage data, financial data, health data, census data, etc.

Architecture

Figure 1:
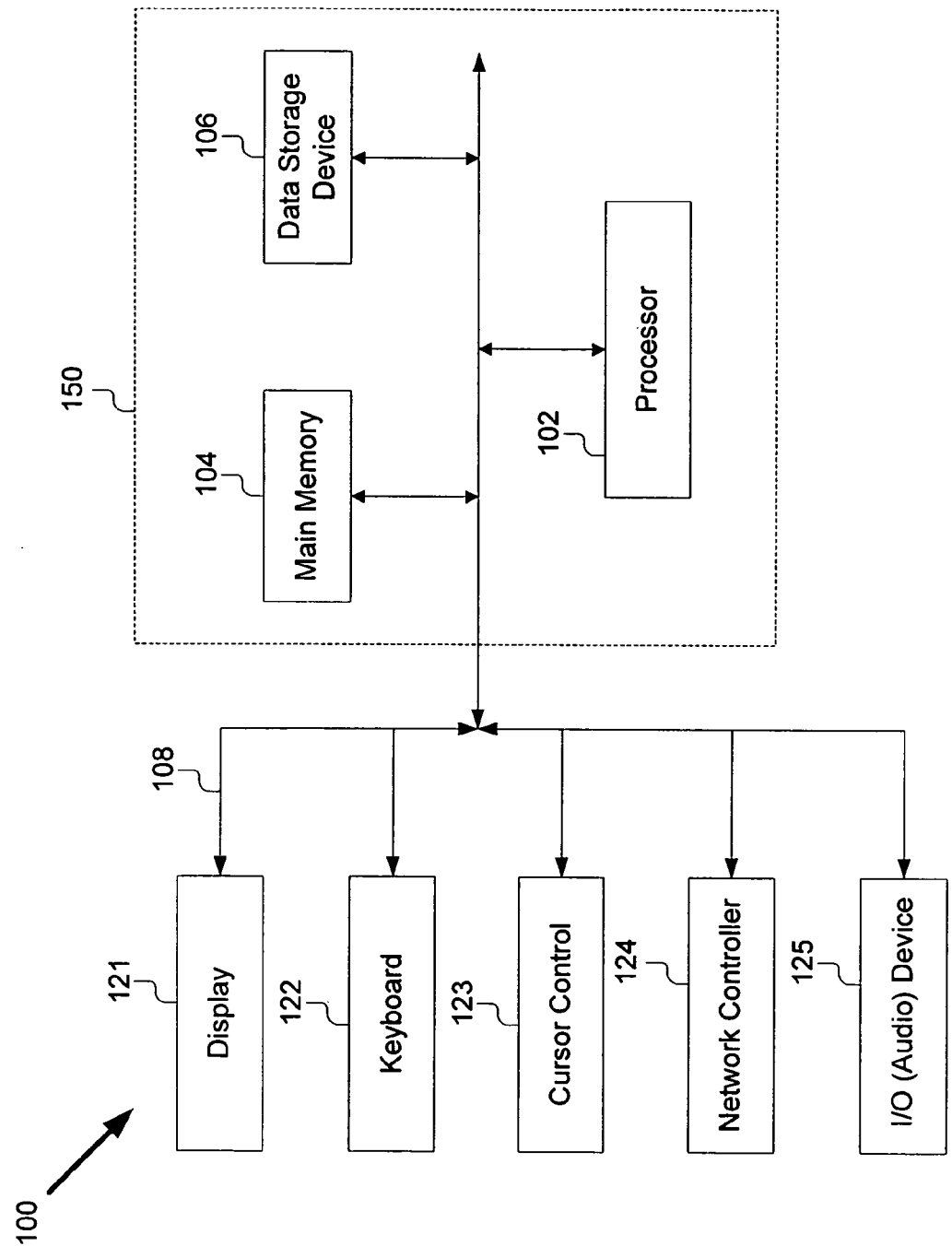
FIG. 1 is a block diagram of a system for operating the web analytics tool of the present invention.

FIG. 1 is a block diagram of one embodiment of the system 100. While the present invention will now be described in the context of a von Neumann architecture, it should be understood that one embodiment of the present invention divides functionality in a client/server architecture. Referring to FIG. 1, the system 100 is shown as including a control unit 150, a display 121, a keyboard 122, a cursor controller 123, a network controller 124, and an input/output device 125. The control unit 150 is shown including a processor 102, main memory 104, and a data storage device 106, all of which are communicatively coupled to system bus 108.

Processor 102 processes data signals and may comprise various computing architectures including a complex instruction set computer (CISC) architecture, a reduced instruction set computer (RISC) architecture, or an architecture implementing a combination of instruction sets. Although only a single processor is shown in FIG. 1, multiple processors may be included.

Main memory 104 may store instructions and/or data that may be executed by processor 102. The instructions and/or data may comprise code for performing any and/or all of the techniques described herein. Main memory 104 may be a dynamic random access memory (DRAM) device, a static random access memory (SRAM) device, or some other memory device known in the art. The memory 104 is described in more detail below with reference to FIG. 2. In particular, the portions of the memory 104 for providing dynamic path flow display are shown in detail.

Data storage device 106 stores data and instructions for processor 102 and may comprise one or more devices including a hard disk drive, a floppy disk drive, a CD-ROM device, a DVD-ROM device, a DVD-RAM device, a DVD-RW device, a flash memory device, or some other mass storage device known in the art. More specifically for Web analytics a disk array or multiple servers and associated database may be used as the data storage device 106.

System bus 108 represents a shared bus for communicating information and data throughout control unit 150. System bus 108 may represent one or more buses including an industry standard architecture (ISA) bus, a peripheral component interconnect (PCI) bus, a universal serial bus (USB), or some other bus known in the art to provide similar functionality.

Additional components coupled to control unit 150 through system bus 108 include display device 121, keyboard 122, cursor control device 123, network controller 124 and I/O device 125. Display device 121 represents any device equipped to display electronic images and data as described herein. Display device 121 may be a cathode ray tube (CRT), liquid crystal display (LCD), or any other similarly equipped display device, screen, or monitor. Keyboard 122 represents an alphanumeric input device coupled to control unit 150 to communicate information and command selections to processor 102. Cursor control 123 represents a user input device equipped to communicate positional data as well as command selections to processor 102. Cursor control 123 may include a mouse, a trackball, a stylus, a pen, a touch screen, cursor direction keys, or other mechanisms to cause movement of a cursor. Network controller 124 links control unit 150 to a network that may include multiple processing systems. The network of processing systems may comprise a local area network (LAN), a wide area network (WAN) (e.g., the Internet), and/or any other interconnected data path across which multiple devices may communicate.

One or more I/O devices 125 are coupled to the system bus 108. For example, the I/O device 125 may be an audio device 125 equipped to receive audio input and transmit audio output. Audio input may be received through various devices including a microphone within audio device 125 and network controller 124. Similarly, audio output may originate from various devices including processor 102 and network controller 124. In one embodiment, audio device 125 is a general purpose audio add-in/expansion card designed for use within a general purpose computer system. Optionally, audio device 125 may contain one or more analog-to-digital or digital-to-analog converters, and/or one or more digital signal processors to facilitate audio processing.

It should be apparent to one skilled in the art that control unit 150 may include more or less components than those shown in FIG. 1 without departing from the spirit and scope of the present invention. For example, control unit 150 may include additional memory, such as, for example, a first or second level cache, or one or more application specific integrated circuits (ASICs). Similarly, additional components may be coupled to control unit 150 including, for example, image scanning devices, digital still or video cameras, or other devices that may or may not be equipped to capture and/or download electronic data to control unit 150.

Figure 2:
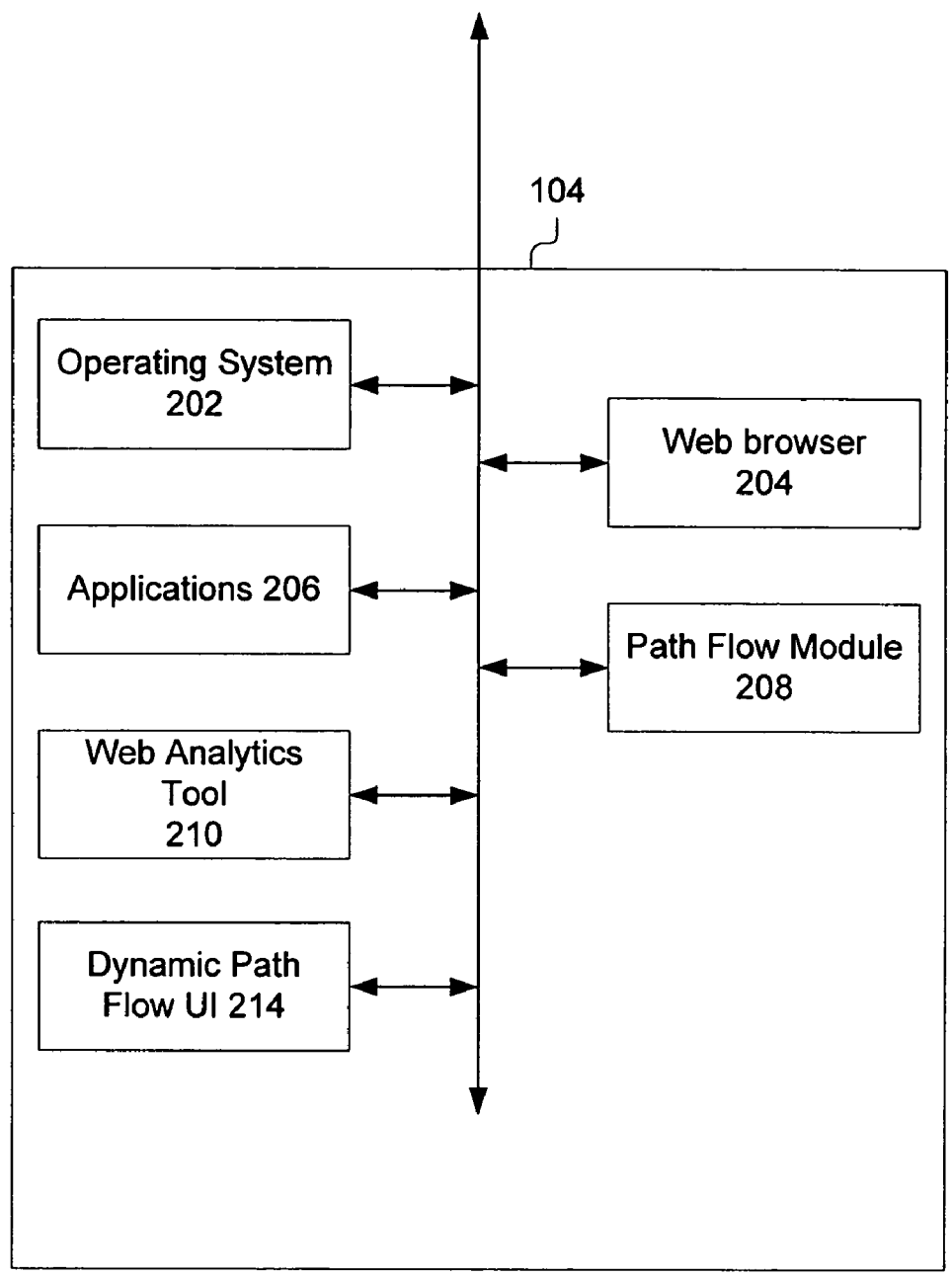
FIG. 2 is block diagram of a preferred embodiment of the memory of the system of FIG. 1.

FIG. 2 illustrates one embodiment of memory 104 of the present invention including operating system 202, a web browser 204, applications 206, a path flow module 208, a web analytics tool 210, and a dynamic path flow user interface (UI) 214.

The operating system 202 is preferably one of a conventional type such as WINDOWS®, SOLARIS® or LINUX® based operating systems.

The web browser 806 is of a conventional type that provides access to the Internet and processes HTML, XML or other mark up language to generated images on the display device 121. For example, the web browser 204 could be Mozilla Firefox or Microsoft Internet Explorer.

The memory unit 104 also includes one or more application programs 206 including, without limitation, word processing applications, electronic mail applications, spreadsheet applications, and web browser applications.

The memory 104 also includes a web analytics tool 210 such as Site Catalyst version 11 from Omniture of Orem, Utah.

The path flow module 208 is a program or routines for collecting and processing information as to visitation path flows for websites and web pages. In particular, the path flow module 208 determines which visitation paths tend to be followed and generates statistics describing such visitation paths. Demographic and geographic information regarding website visitors are monitored so that trends can be identified. The collected information is processed to generate statistics that can be displayed in a report, either in tabular form or in graphical form. In particular, in one embodiment of the present invention the path flow statistics are shown in a dynamic report via dynamic path flow UI 214.

The dynamic path flow UI 214 is a program or routines for generation of user interfaces for presentation of path flow data in an interactive manner. The dynamic path flow UI 214 is coupled to the web analytics tool 210 and the path flow module 208. The dynamic path flow UI 214 receives data from each of these modules 208 and 210, and creates one or more user interfaces for display of the combined information to the user. The operation of the dynamic path flow UI 214 is described in more detail below.

Figure 3A:
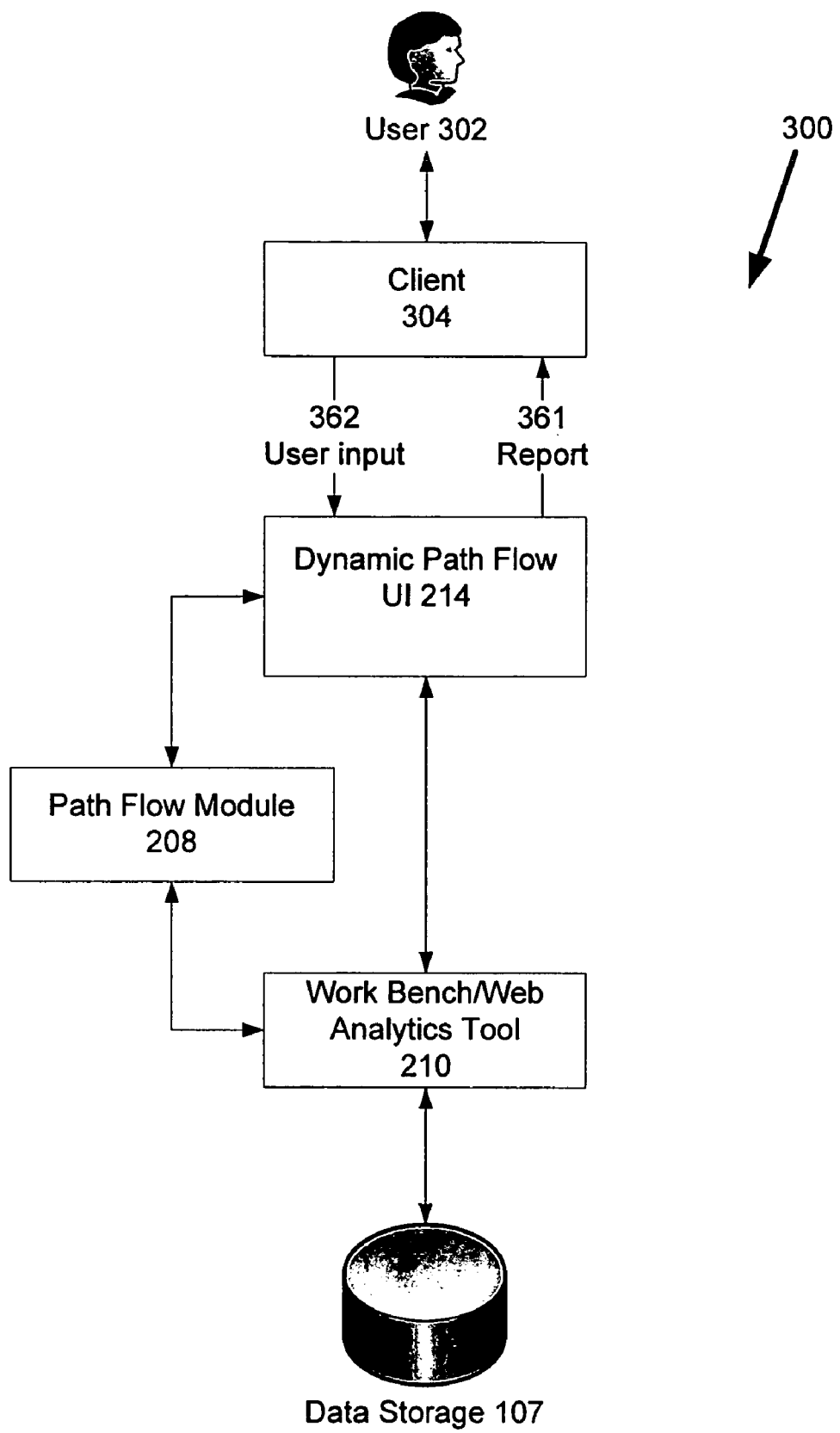
FIG. 3A is functional block diagram of the interaction of the system of the present invention with a user, a web analytics tool and a database.

Referring now to FIG. 3A, a block diagram showing the interaction of the components of the present invention in a web analytics system 300 will be described. The dynamic path flow UI 214 presents path flow reports 361 generated by the web analytics tool 210. The dynamic path flow UI 214 also presents an interface that allows a user 302 to provide user input 362 that is sent to the path flow module 208. In this manner, user 302 can interact with path flow reports 361. The dynamic path flow UI 214 is coupled for communication with the path flow module 208 and the web analytics tool 210.

The web analytics tool 210 is coupled to a data set or database in data storage 107. The data set can then be further manipulated by the web analytics tool 210 for the creation of reports, display to the user, tracking, targeting, and notification of users based on the data. Those skilled in the art will recognize that the functionality provided by the dynamic path flow UI 214 may be integrated into the path flow module 208 and in such an embodiment the path flow module 208 would interact directly with the client 304.

Figure 3B:
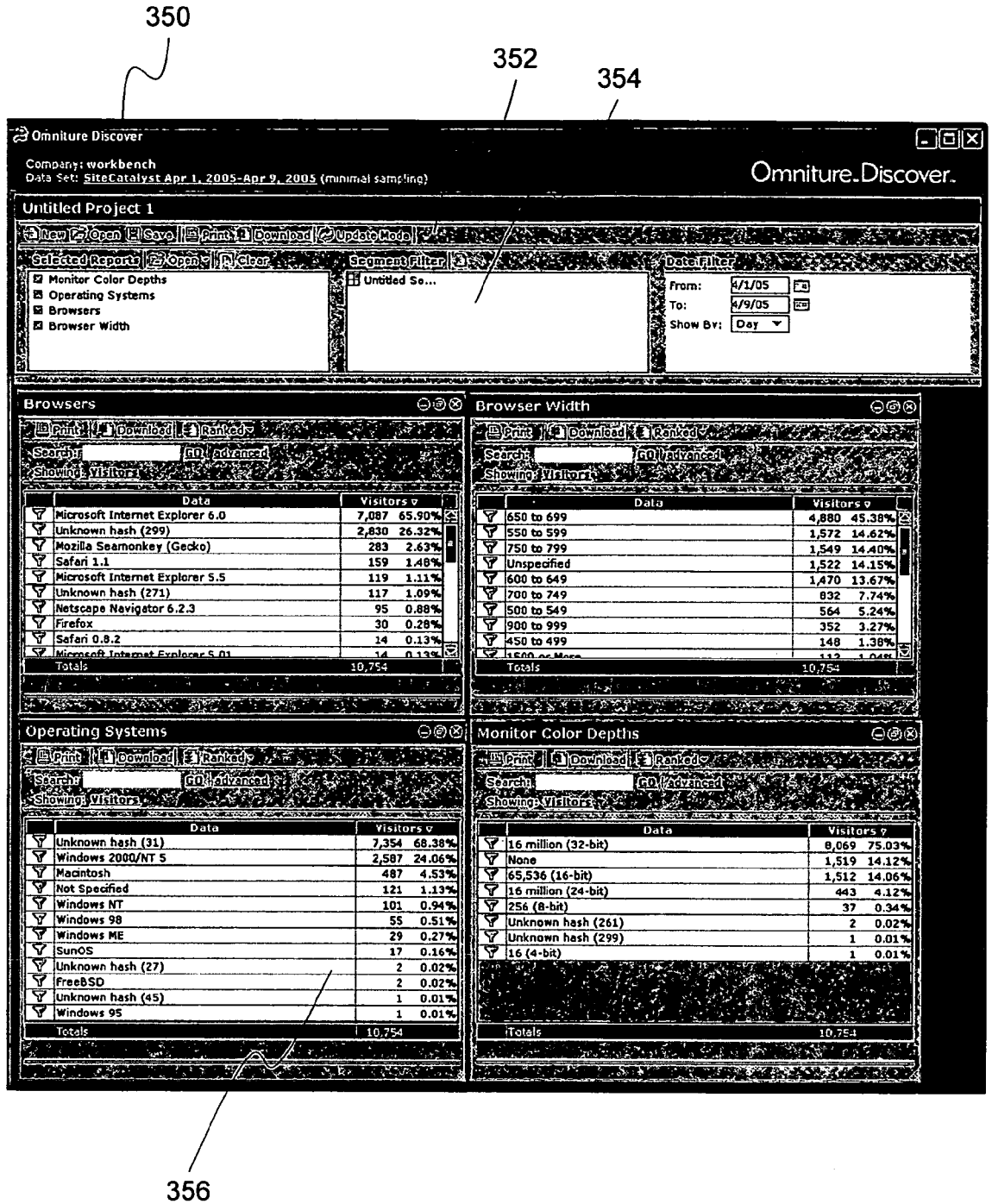
FIG. 3B is a graphical representation of a graphical user interface according to prior art web analytics tools for presenting web analytics data.
Figure 4:
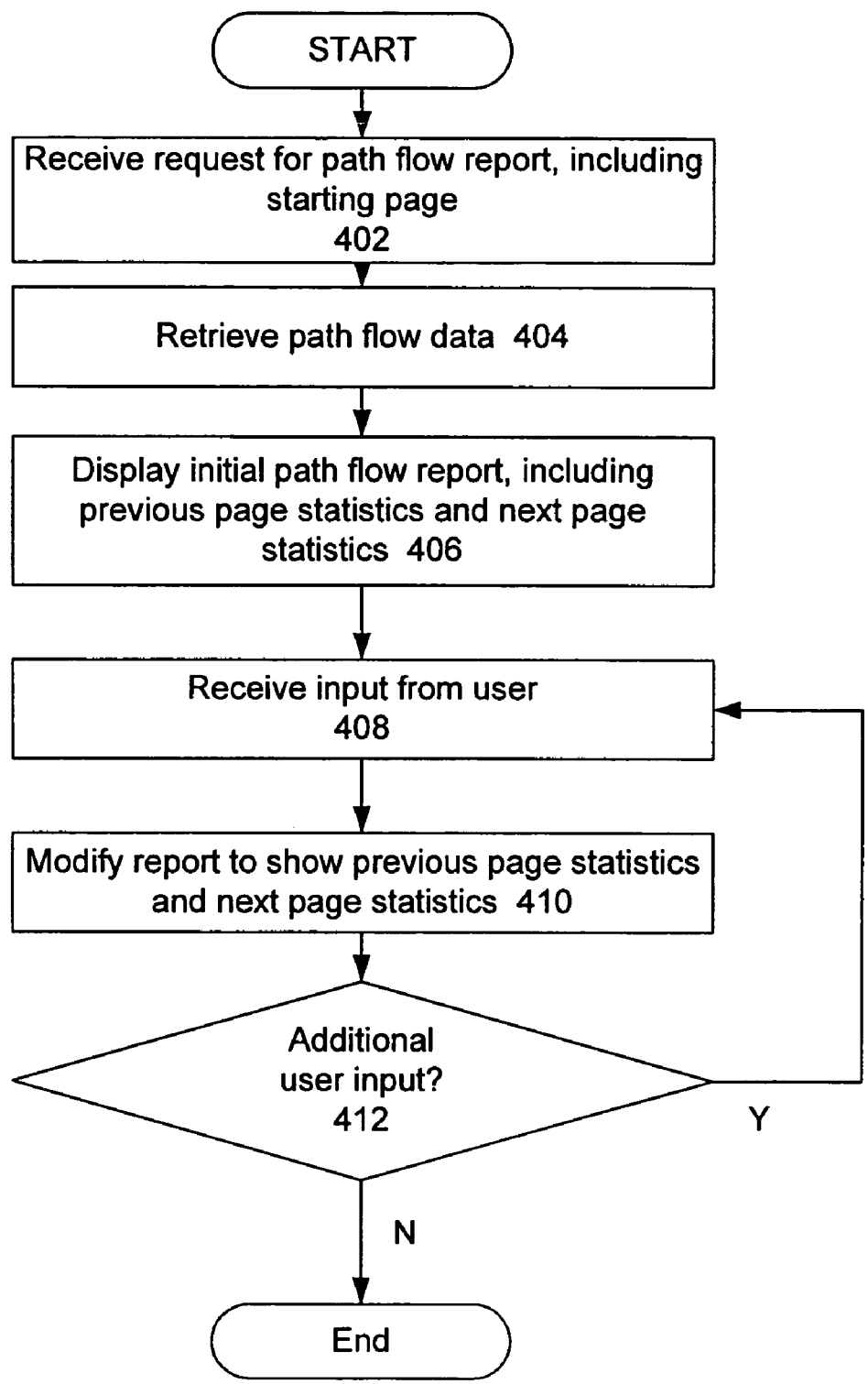
FIG. 4 is a flow chart of a method for displaying a dynamic path flow report according to one embodiment of the present invention.

Referring now to FIG. 3B, an exemplary graphical user interface generated by the web analytics tool 210 for presenting web analytics data is shown. The user interface 350 includes a menu bar 352 for performing different operations on the data and in the presentation of the data. Any number of date reports may be generated and information used to generate the reports is provided in a report and filter section 354. The user interface 350 includes a plurality of tiles 356 for displaying the specific web analytics data. This is only one of a number of user interfaces generate by the web analytics tool 210. Those skilled in the art will recognize that the present invention can be used in conjunction with or in addition any of the reports and interfaces of the web analytics tool 210.

Creation of Dynamic Path Flow Reports

Referring now to FIGS. 4 and 5A-5C, one embodiment of a method for generating and interacting with dynamic path flow reports will be described. A request for a path flow report is received 402, including a starting page that the user is interested. This request may be initiated by the user, for example by clicking on a link representing a web page.

Responsive to the report request, path flow data is retrieved 404. In one embodiment, the data is retrieved from data storage 107 where previously collected site visitation data is stored. An initial path flow report is displayed 406.

Figure 5A:
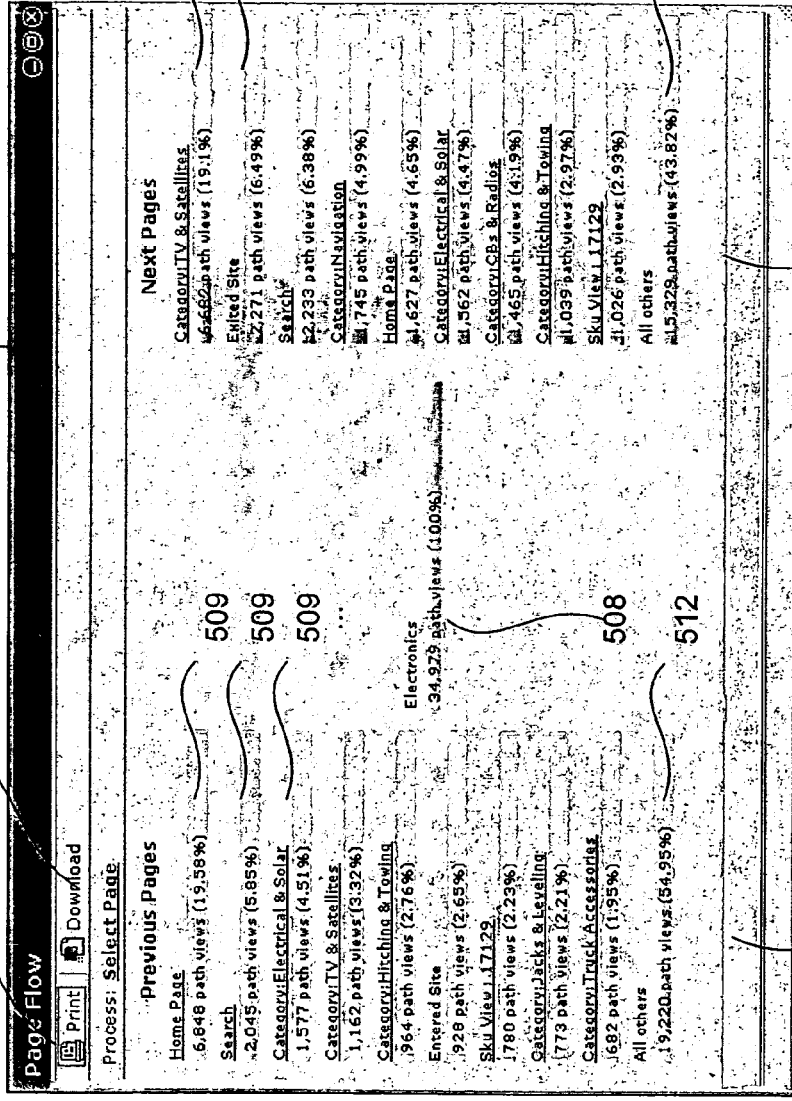
FIGS. 5A-5C are examples of dynamic path flow reports according to the present invention.

Referring now also to FIG. 5A, there is shown an example of an initial path flow report 500. Path flow report 500 represents a combination of a previous and next page flow report, showing statistics for website visitation preceding and following the indicated path or starting page. As described in more detail below, the combined report as shown allows users to dynamically traverse path flow in both directions.

The central area of report 500 shows a path, which in the example includes a single page 508 having a title of "Electronics". A colored bar below the word "Electronics" provides a graphic indicator of the number of path views (visits) for starting page 508. Superimposed on the colored bar is a textual representation of the number of path views. In the example shown, there were 34,979 path views that included the "Electronics" starting page 508; these path views represent 100% of the total path views being presented in report 500.

Previous Pages column 506 shows a list of pages 509 that were visited immediately prior to the path, i.e. immediately prior to starting page 508, and Next Pages column 507 shows a list of pages 510 that were visited immediately after the path, i.e. immediately after starting page 508. For each previous page 509, there is shown the title of the page and a colored bar depicting the percentage of visitors who traversed the path including starting page 508 immediately after visiting that particular previous page 509. Superimposed on the colored bar is a textual representation of the number of path views to that previous page 509 that immediately preceded traversal of the path including starting page 508. The textual representation is shown as an actual number of path views and as a percentage of all path views detected at the starting page 508. An "All others" entry 512 shows an aggregate number of path views for all pages, other than the listed pages 509, which immediately preceded the starting page 508 in a visitation path.

For each next page 510, there is shown the title of the page and a colored bar depicting the percentage of visitors to the starting page 508 that visited that particular next page 509 immediately after traversing the path, i.e. immediately after visiting the starting page 508 (and any selected previous pages). Superimposed on the colored bar is a textual representation of the number of path views to that next page 510 that immediately followed traversal of the path including starting page 508. The textual representation is shown as an actual number of path views and as a percentage of all path views detected at the starting page 508. An "All others" entry 513 shows an aggregate number of path views for all pages, other than the listed pages 510, which immediately followed the starting page 508 in a visitation path.

Print button 505 prints out report 500. Download button 511 downloads report 500.

Referring again to FIG. 4, user input is received 408. In one embodiment, pages 509, 510 in the Previous and Next Pages columns 506, 507 are clickable links. The user can click on any of the links to either 1) add the corresponding page to the path being analyzed, or 2) specify a new path to be analyzed, the new path including the page corresponding to the link (in other words, designating the selected page as a new starting page 508). In one embodiment, one of these two operations takes place in response to the user action. In another embodiment, the user can select which of the two operations is desired, for example via a context-sensitive menu that appears when the link is clicked.

Responsive to the received user input, the displayed report 500 is modified 410 to show previous page statistics and next page statistics.

Figure 5B:
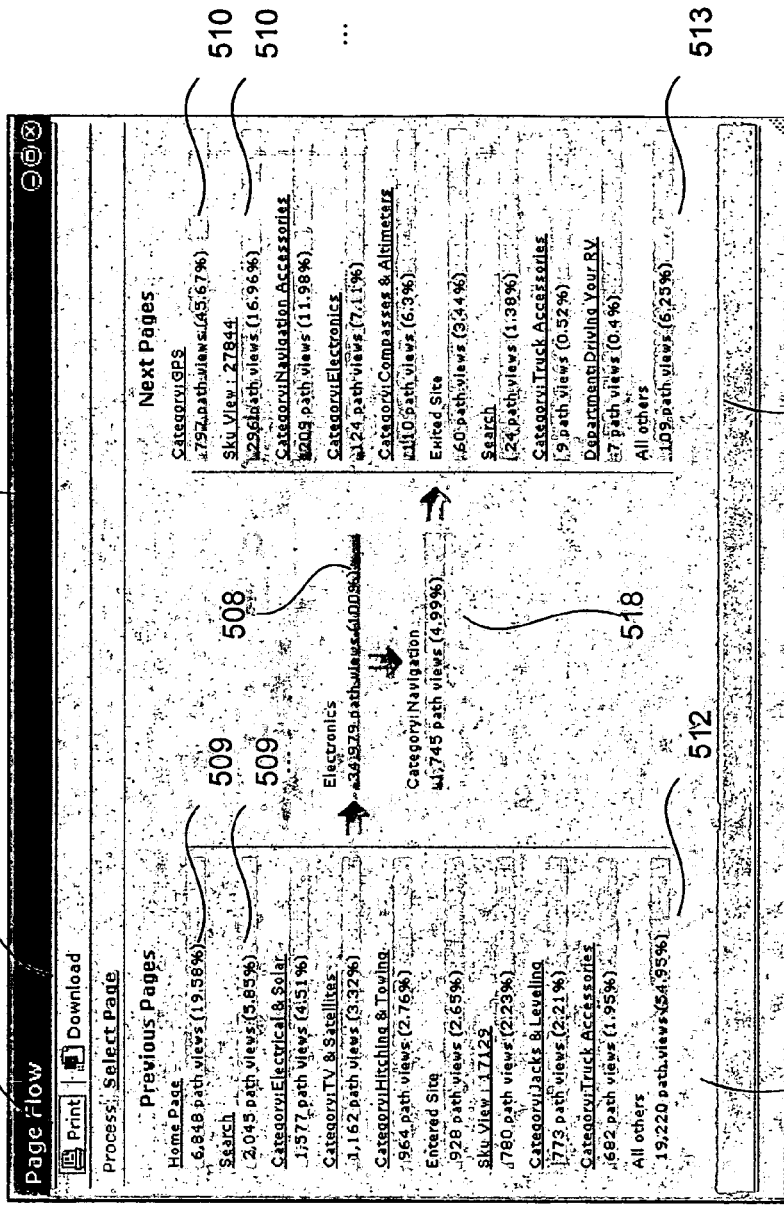

Referring now to FIG. 5B, there is shown an example of report 500 after the user has clicked on the link corresponding to the "Category: Navigation" page in FIG. 5A. The "Category: Navigation" page 518 now appears in the center area of report 500, underneath starting page 508. An arrow is shown between starting page 508 and "Category: Navigation" page 518 to emphasize that the path now includes both the "Electronics" starting page 508 and the "Category: Navigation" page 518. The report 500 is updated to indicate a path flow of any of the pages in previous page column 506 to "Electronics" to "Category: Navigation" to any of the pages in next page column 507.

In one embodiment, Next Pages column 507 in FIG. 5B shows path view totals and percentages for those site visitors who traversed the entire path shown in the center of report 500, i.e. those who visited the Electronics page immediately followed by the "Category: Navigation" page. Thus, each path view total shows the number of site visitors who visited the particular page after visiting the Electronics page and the "Category: Navigation" page in that order. Also shown is the number of path views for each page, as a percentage of those visitors who visited the page after visiting the Electronics page and the "Category: Navigation" page in that order.

In the embodiment shown in FIG. 5B, Previous Pages column 507 is unchanged from that of FIG. 5A, so that it still shows how many site visitors visited each listed page before visiting the Electronics page. Alternatively, Previous Pages column 507 can show how many site visitors visited each listed page before traversing the path shown in the center of report 500, i.e., visiting both the Electronics page and the "Category: Navigation" page in that order.

Any number of pages can be shown in the center area of report 500, representing a path being analyzed. In one embodiment, the user can click on any displayed page in the center area; clicking on one of the pages displayed there causes the selected page to become the starting page 508. Next page column 507 and previous page column 506 are updated accordingly, based on the re-designation of starting page 508. In this manner, the pages shown in the center area form a trail of "bread crumbs" that allow the user to return to a previous state for report 500 without having to re-run the report or re-specify its parameters. In one embodiment, successive states for report 500 are cached, so as to provide improved performance when returning to a previous state.

Figure 6:
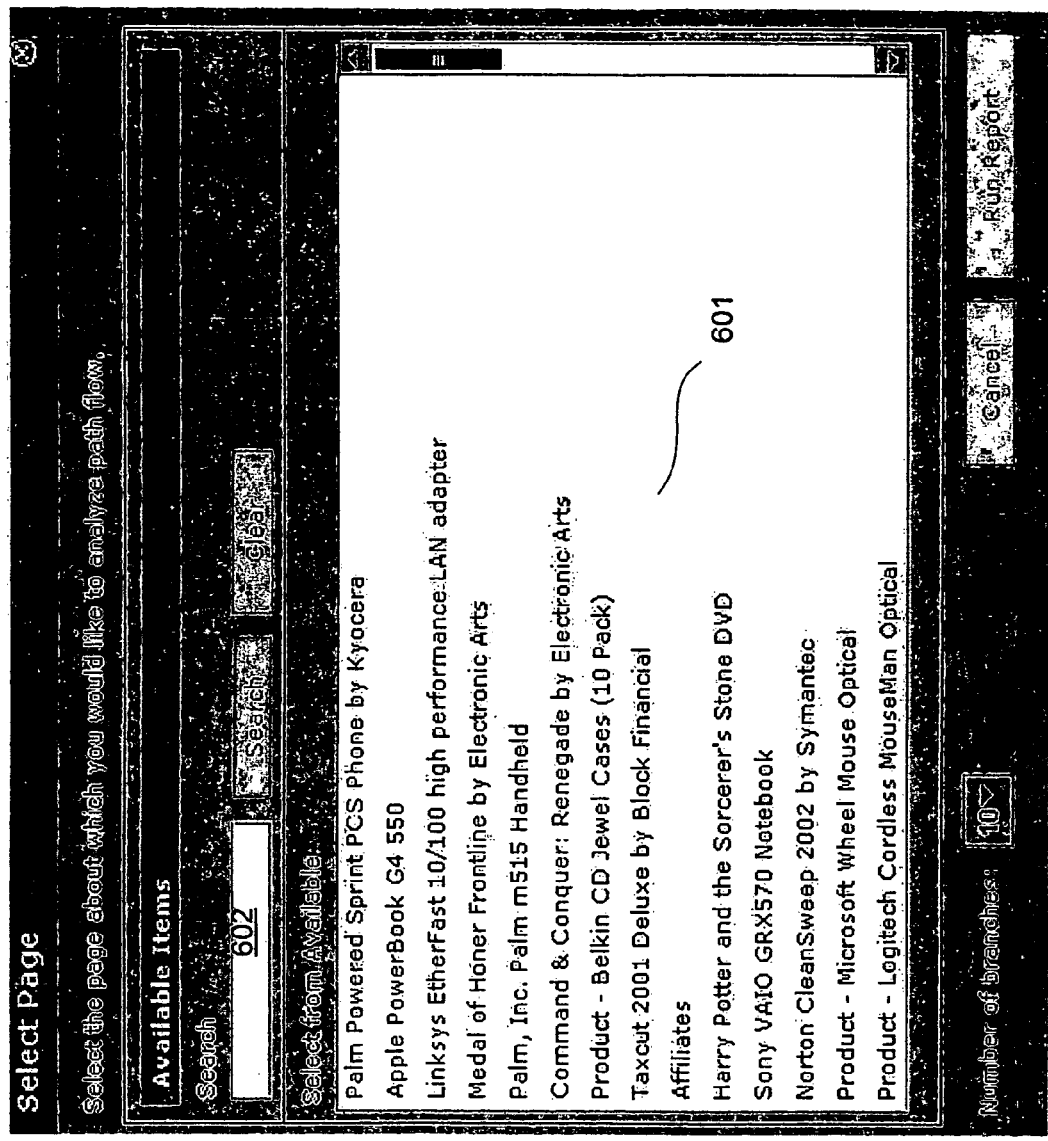
FIG. 6 is an example of a dialog box for selecting a new starting page according to one embodiment of the present invention.

In one embodiment, the user may designate a new starting page 508, for example via a dialog box 600 as shown in FIG. 6. Dialog box 600 can be presented in response to user entry of a keyboard command or menu command, or the like.

Dialog box 600 presents a list 601 of available web pages from which a selection can be made. In one embodiment, search box 602 allows the user to search for a particular web page to be designated as a starting page 508.

Figure 7:
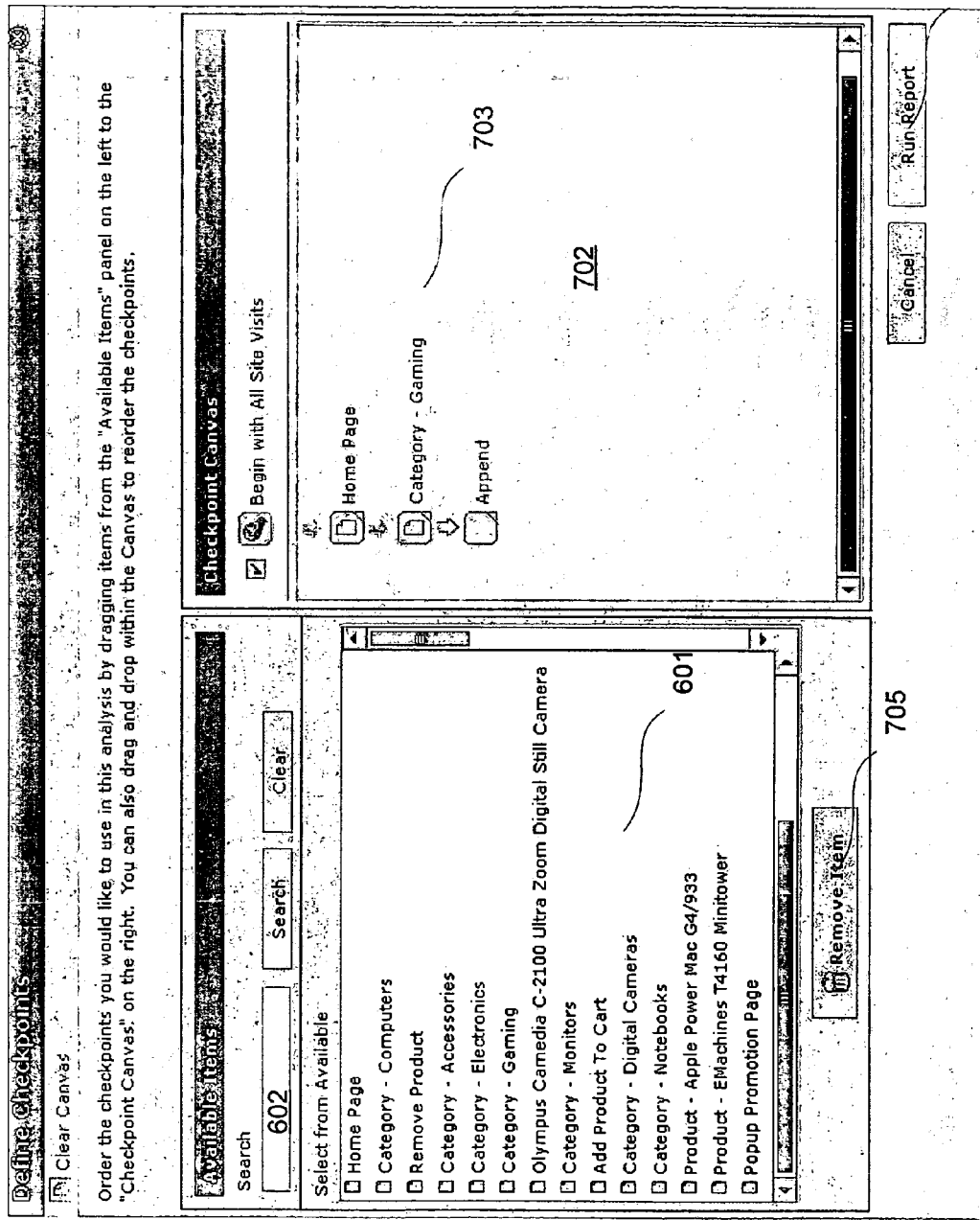
FIG. 7 is an example of a dialog box for designating a path for analysis according to one embodiment of the present invention.

In one embodiment, the user may designate a path for analysis using an alternative interface such as the dialog box 700 shown in FIG. 7. The user can drag items from list 601 of available web pages to checkpoint canvas pane 702 in order to construct the path 703 to be analyzed. The user can also drag items within checkpoint canvas pane 702 to reorganize the path 703 to be analyzed. The user can also remove items from path 703, for example by selecting them and clicking on Remove Item button 705 or by hitting a key such as a Delete key (not shown). In one embodiment, search box 602 allows the user to search for a particular web page to be included in path 703. Once the user has constructed the path 703, he or she can click on Run Report button 706 to cause the report to be run.

In one embodiment, the visits to the various pages must be consecutive, with no intervening page visits. In other embodiments, the visits need not be consecutive. Certain pages can be considered less significant than others, so that user visits to relatively tangential pages are ignored. For example, if a user visits a Help page between the "Category: Navigation" page and the "Category: GPS" page, that detour to the Help page may be ignored and the path view of the "Category: GPS" page can be counted in the Next Pages column 507. In one embodiment, a user interacting with the system of the present invention can indicate which pages are significant and which are less significant. Techniques for specifying such distinctions among pages are described in related U.S. patent application Ser. No. 10/609,008, filed Jun. 27, 2003, for CAPTURING AND PRESENTING SITE VISITATION PATH DATA, the disclosure of which is incorporated herein by reference.

The user can continue to click on any of the links in next page column 507 or previous page column 506 to explore deeper paths in either direction.

In one embodiment, when the user clicks on a page 509, 510 in FIG. 5A, that page is added to the path being studied, so that report 500 is redisplayed with the new page added to the center section of the report. In another embodiment, when the user clicks on a page 509, 510, the selected page becomes the new start page; report 500 is redisplayed with the selected page as the new start page. In another embodiment, the user can choose whether the selected page is added to the path or replaces the starting page 508. For example, the user can click on a page 509, 510 to add it to the path, or can right-click on it to specify a new path including only the selected page. One skilled in the art will recognize that many other variations are possible.

Referring again to FIG. 4, if any additional user input is provided 412, for example if the user clicks on any of the displayed links within report 500, the system of the present invention returns to step 408 where the user input is received and the report 500 is again modified.

Figure 5C:
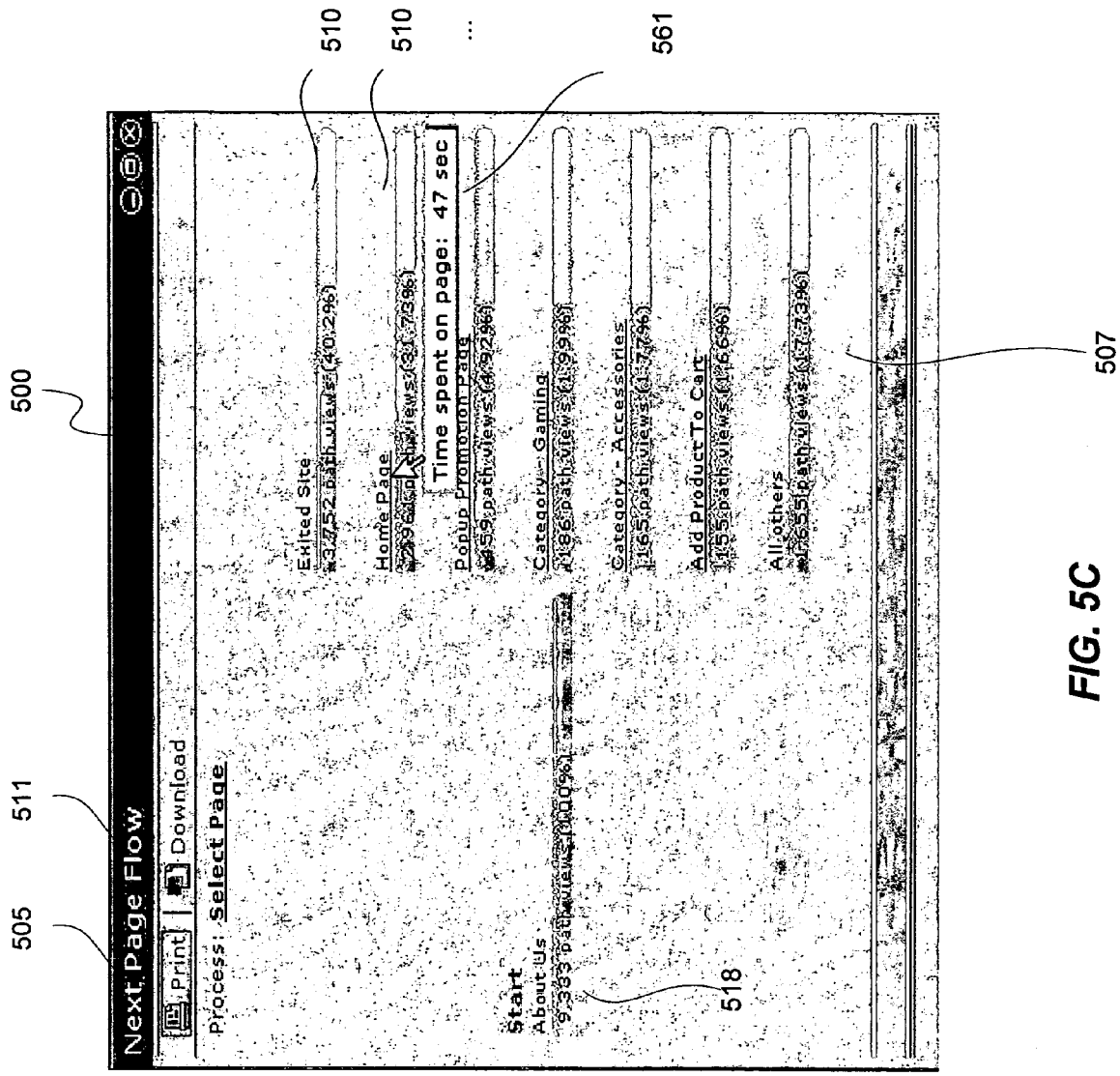

In one embodiment, additional information can also be provided for any displayed page 509, 508, 518, or 510. For example, as shown in FIG. 5C, a Tooltip box 561 can be displayed if the user hovers over a page 510. Tooltip box 561 may contain any information about the underlying page and/or the particular visit to that page. In the example of FIG. 5C, Tooltip box 561 shows the average amount of time spent by visitors on the page 510. In other embodiments, other types of information can be provided, including metadata about the page, statistics as to user visitation, a thumbnail image of the page itself, and the like.

Figure 5D:
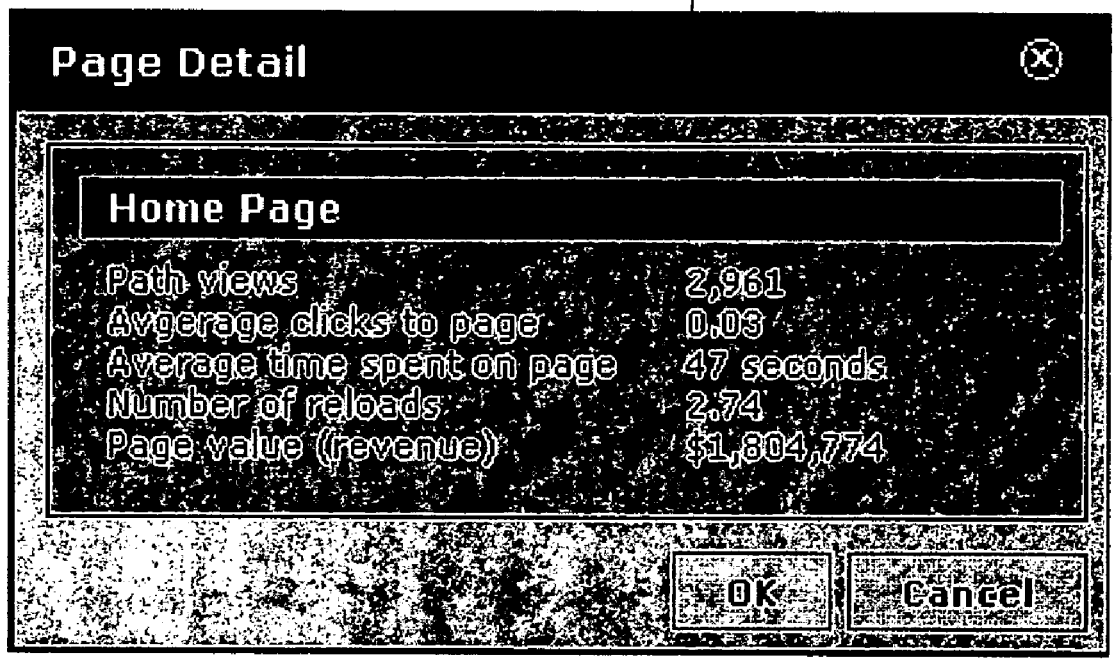
FIG. 5D is an example of a page detail in a dynamic path flow report according to the present invention.

In one embodiment, even more detailed information can be provided for a particular page 509, 508, 518, or 510. For example, a user can right-click while a cursor is positioned on page 509, 508, 518, or 510, and can select a "More Information" (or similar) command. Referring now to FIG. 5D, there is shown an example of a Page Detail box 570 that can be shown in response to user selection of such a command. Any type of information can be shown in Page Detail box 570, including metrics and/or other details. While the present invention has been described with reference to certain preferred embodiments, those skilled in the art will recognize that various modifications may be provided. For example, certain embodiments may employ multiple application servers, acting in cooperation to perform a function or request. Any of the above functions or requests can be sent across a network. Variations upon and modifications to the preferred embodiments are provided for by the present invention.

Alternative Embodiment Using Third-Party Visualization Software

In one embodiment, the present invention is implemented using third-party visualization software in order to improve responsiveness, functionality, and robustness. An example of such a third-party visualization software package is Prefuse, an extensible software framework developed under the open-source model for software development. Prefuse additionally provides a basic data layer and extensible API. Prefuse is described more fully at www.prefuse.org.

In one embodiment, some custom modifications are made to Prefuse's TreeView visualization paradigm in order to implement the present invention. For example:

ToolTips: In one embodiment, a class extending prefuse.controls.ToolTipControl can be added to the TreeView prefuse.Display class. This ToolTipControl monitors for itemEntered( ) events and, upon trigger, renders an appropriate javax.swing.JToolTip.

Gradient Edges: In one embodiment, a class extending prefuse.action.assignment.ColorAction exploits metrics stored in each node to calculate an opacity percentage applied to colors for edges in the display.

Dynamic Exploration: In one embodiment, a class extending prefuse.controls.ControlAdapter, added to the TreeView prefuse.Display class, monitors itemClicked( ) events. Upon trigger, Discover then instigates an HTTPS connection with a back-end server and posts an XML request for the previous/next pages related to the item clicked.

Search: In one embodiment, Prefuse's built-in search capability is extended to allow searches of dynamically-fetched content and to match patterns anywhere in a string.

Referring now to FIGS. 8 to 17, there are shown screen shots depicting examples of an embodiment of the present invention using Prefuse. One skilled in the art will recognize that these screen shots are merely examples, and that other layouts and arrangements are possible, either using Prefuse, or using some other visualization tool.

Figure 8:
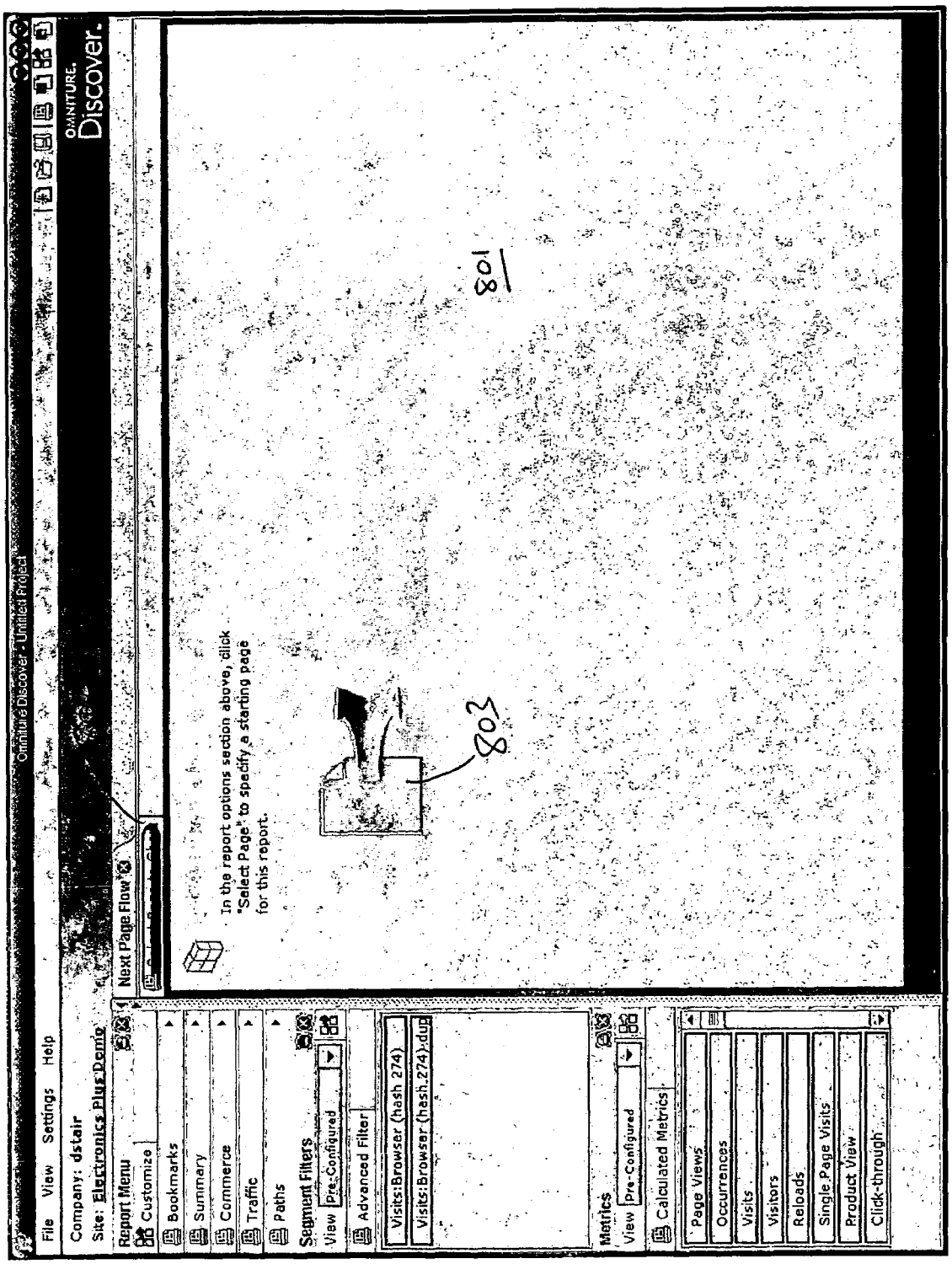
FIG. 8 is an example of an initial screen presented to the user according to one embodiment of the present invention.

FIG. 8 depicts an initial screen 801 presented to the user. The user clicks on "Select Page to Chart" button 802 to select a starting page for the report, to be represented by icon 803. Upon clicking on "Select Page to Chart" button 802, the user is presented with a select page dialog box 600 as described above in connection with FIG. 6.

Figure 9:
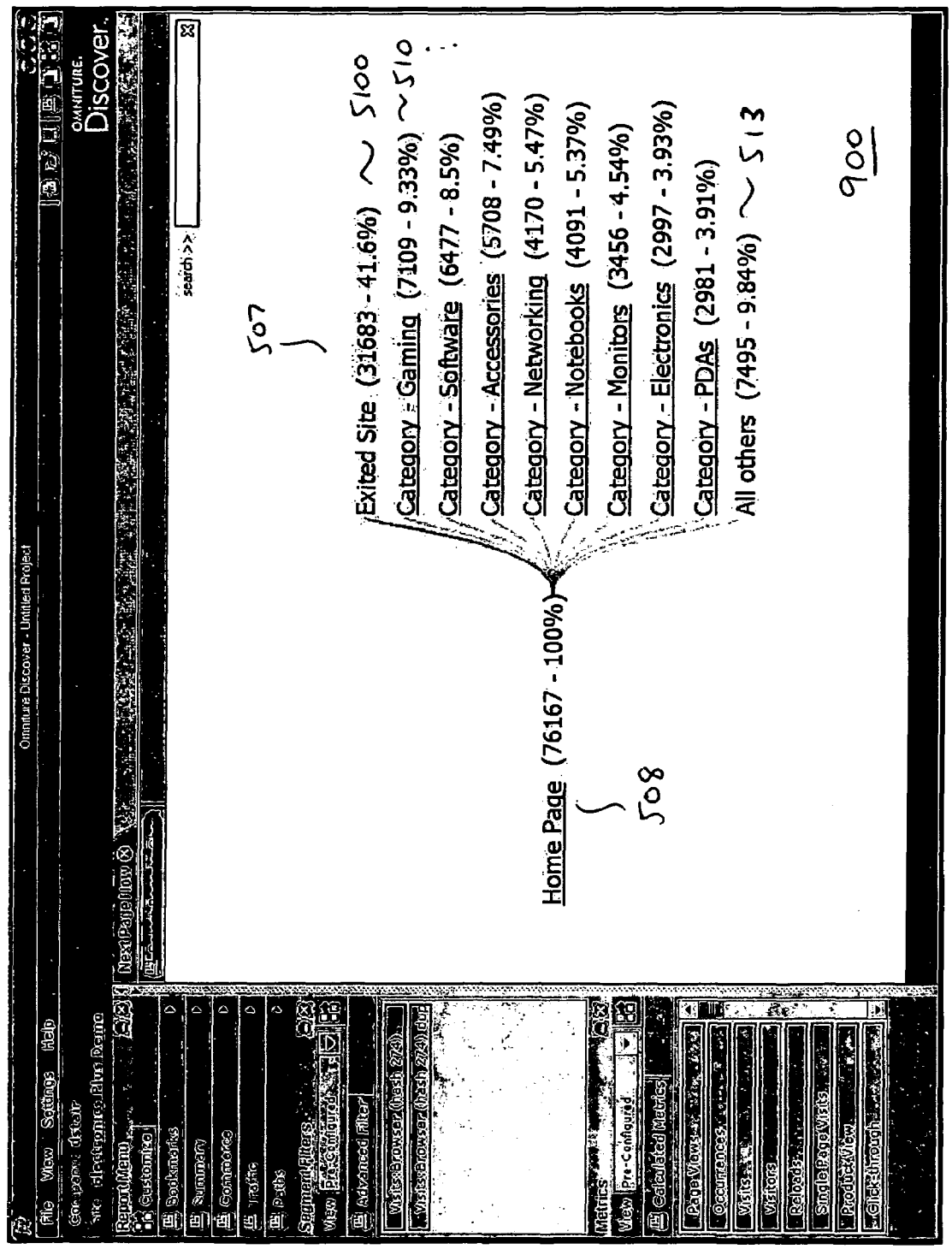
FIG. 9 is an example of a Next Page Flow screen according to one embodiment of the present invention.

FIG. 9 depicts a Next Page Flow screen 900 presented after a starting page 508 has been selected, according to one embodiment using the Prefuse toolkit modified as described above. In the example shown, there were 76,167 path views that included the "Home Page" starting page 508; these path views represent 100% of the total path views being presented in screen 900. Next Pages column 507 shows a list of pages 510 that were visited immediately after the path, i.e. immediately after starting page 508. For each next page 510, there is shown the title of the page and a textual representation of the number of path views to that next page 509 that immediately followed traversal of the path including starting page 508. The textual representation is shown as an actual number of path views and as a percentage of all path views detected at the starting page 508. An "All others" entry 513 shows an aggregate number of path views for all pages, other than the listed pages 510, which immediately followed the starting page 508 in a visitation path. An "Exited Site" entry 5100 shows the number of path views that led to exit from the site immediately after viewing the starting page 508.

Figure 10:
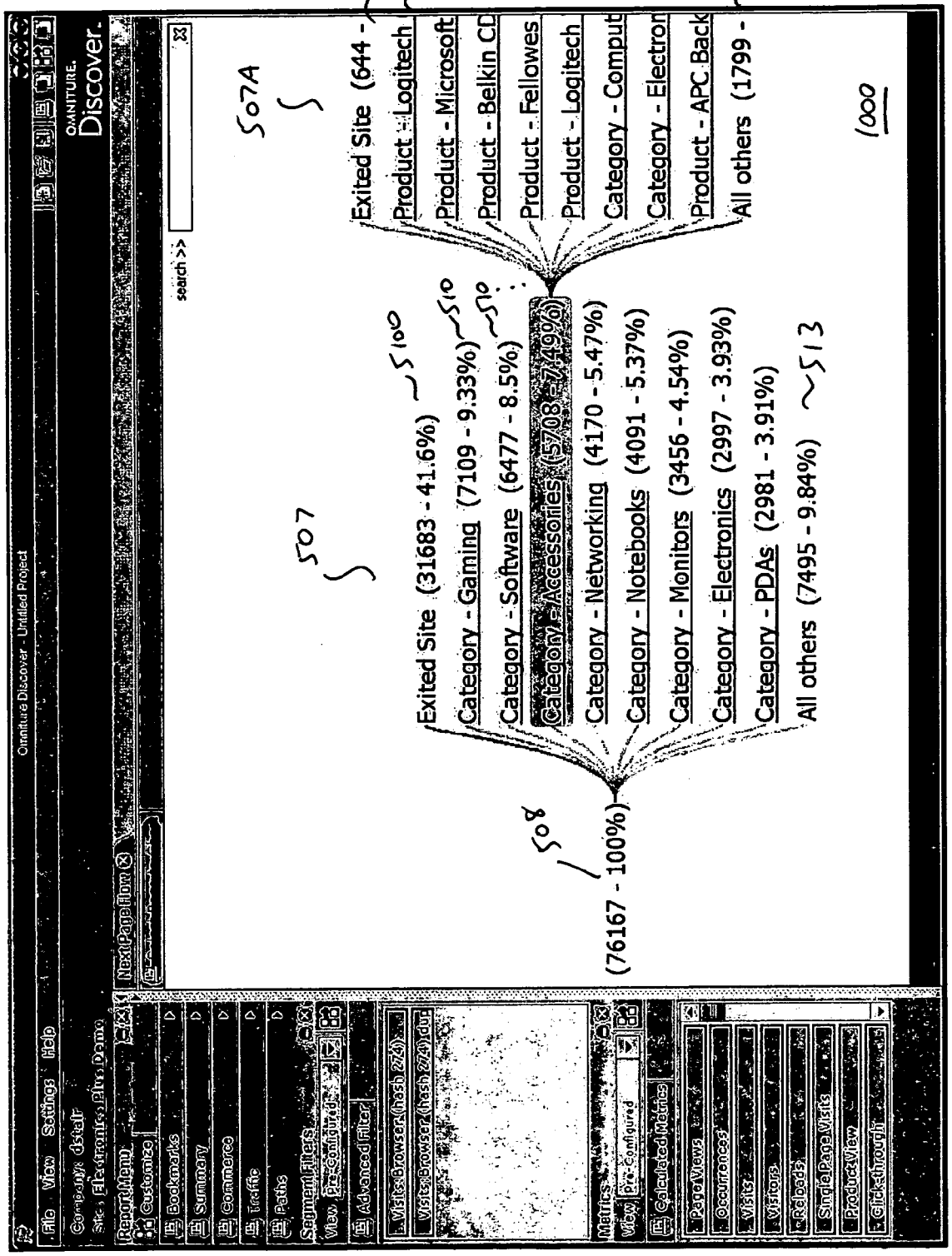
FIG. 10 is an example of a two-level Next Page Flow screen according to one embodiment of the present invention.
Figure 11:
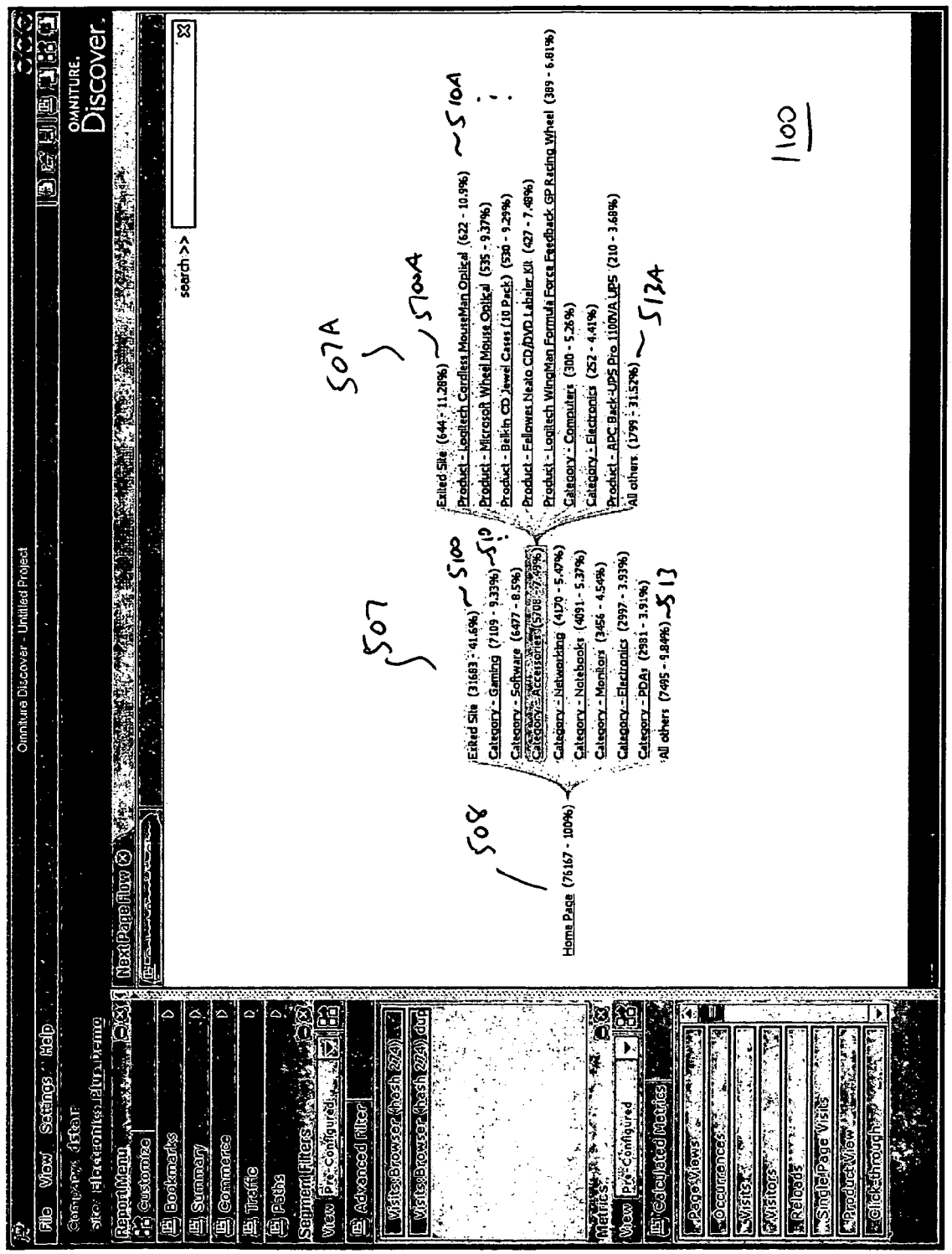
FIG. 11 is an example of an auto-centered two-level Next Page Flow screen according to one embodiment of the present invention.

Pages 510 as shown in FIG. 9 are clickable links. The user can click on a page 510 link to see more detail on path views that included both the starting page 508 and the clicked-on page 510. Referring now to FIG. 10, there is shown an example of a Next Page Flow screen 1000 after the user has clicked on the "Category-Accessories" page 510 link. Column 507 is essentially unchanged from FIG. 9, except that the clicked-on link is highlighted. New column 507A shows path visitation statistics for those paths that included both starting page 508 and Category-Accessories page 510 in that order. Column 507A shows site exits 5100A as well as a list of pages 510 visited after starting page 508 and Category-Accessories page 510. Also shown is an All others entry 513A representing paths that went from starting page 508 to Category-Accessories page 510 and then exited the site immediately after viewing Category-Accessories page 510.

The user can navigate by zooming in or out, scrolling, moving, centering, and the like. In one embodiment, Prefuse's software kit is used to implement such functions. For example, referring now to FIG. 11, there is shown a screen 1100 similar to screen 1000, but centered and zoomed out. Such a display can be generated, for example, using auto-centering capabilities available in Prefuse.

Figure 12:
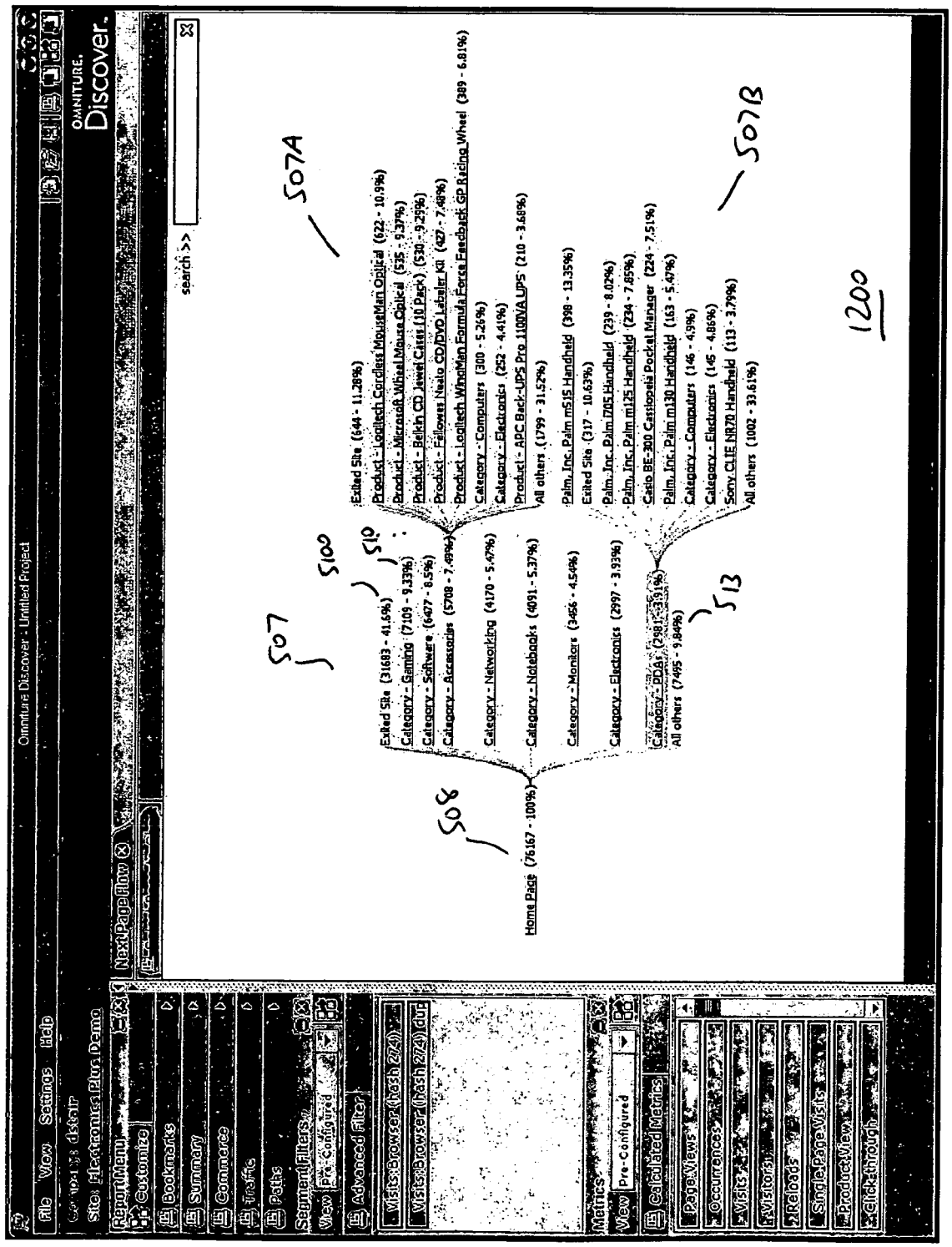
FIG. 12 is an example of a Next Page Flow screen where two page branches are shown simultaneously, according to one embodiment of the present invention.

In one embodiment, the user can explore two or more branches at the same time. For example, FIG. 12 depicts a screen 1200 in which the user has selected two pages 510 from column 507: the Category-Accessories page 510 and the Category-PDAs page 510. One mechanism for selecting two or more pages is by shift-clicking or Ctrl-clicking on a second page after clicking on a first. As shown in FIG. 12, two lists 507A and 507B of pages (page branches) are opened up, one for each selected page 510 in column 507. In this manner, the user can see path statistics for two or more paths simultaneously.

Figure 13:
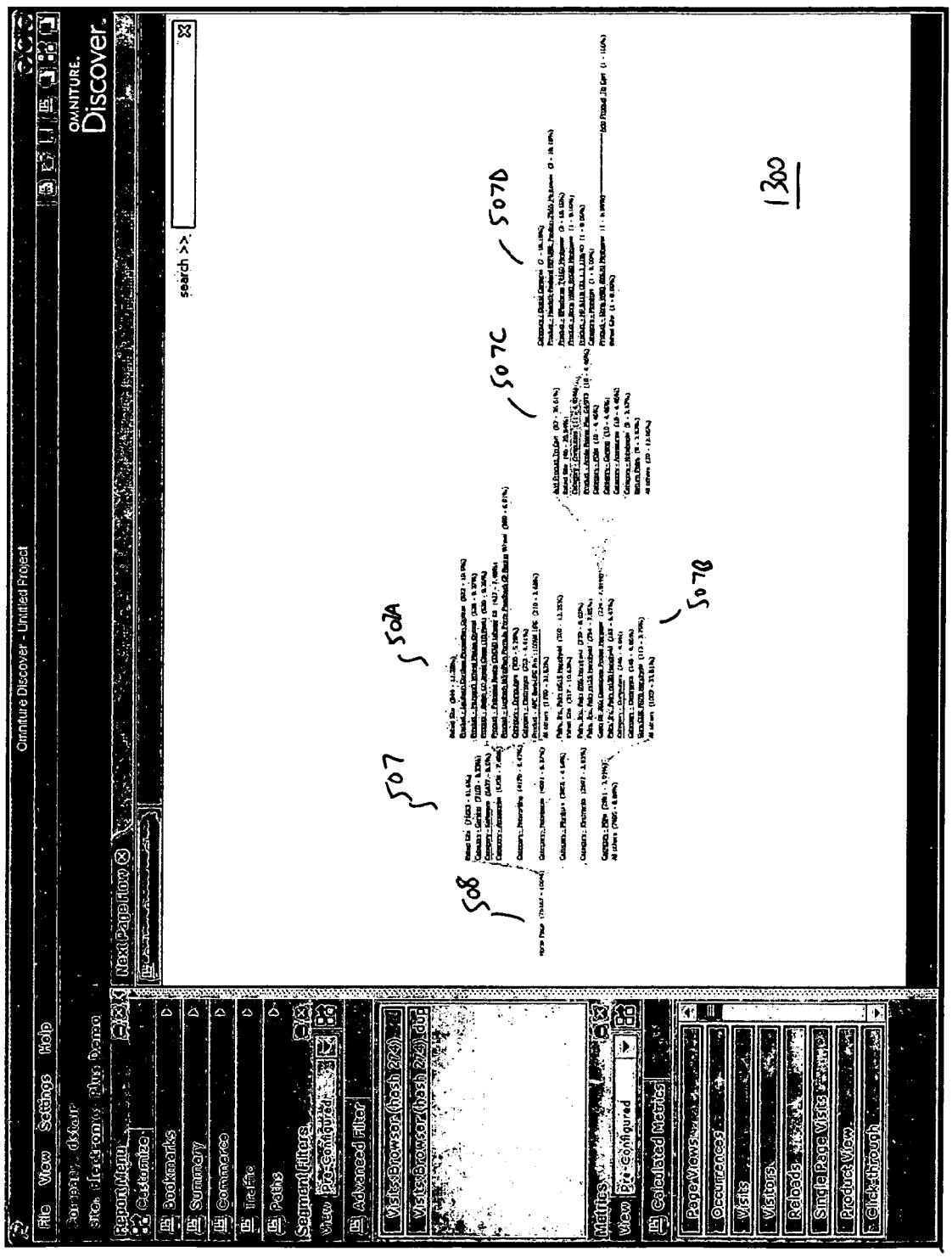
FIG. 13 is an example of a Next Page Flow screen where a multi-level path analysis is shown, according to one embodiment of the present invention.

As shown in screen 1300 of FIG. 13, the user can, in one embodiment, open any number of lists 507A through 507D to explore paths to any desired depth. The user clicks on pages 510 of interest to see the corresponding list of paths that include the selected page 510.

Figure 14:
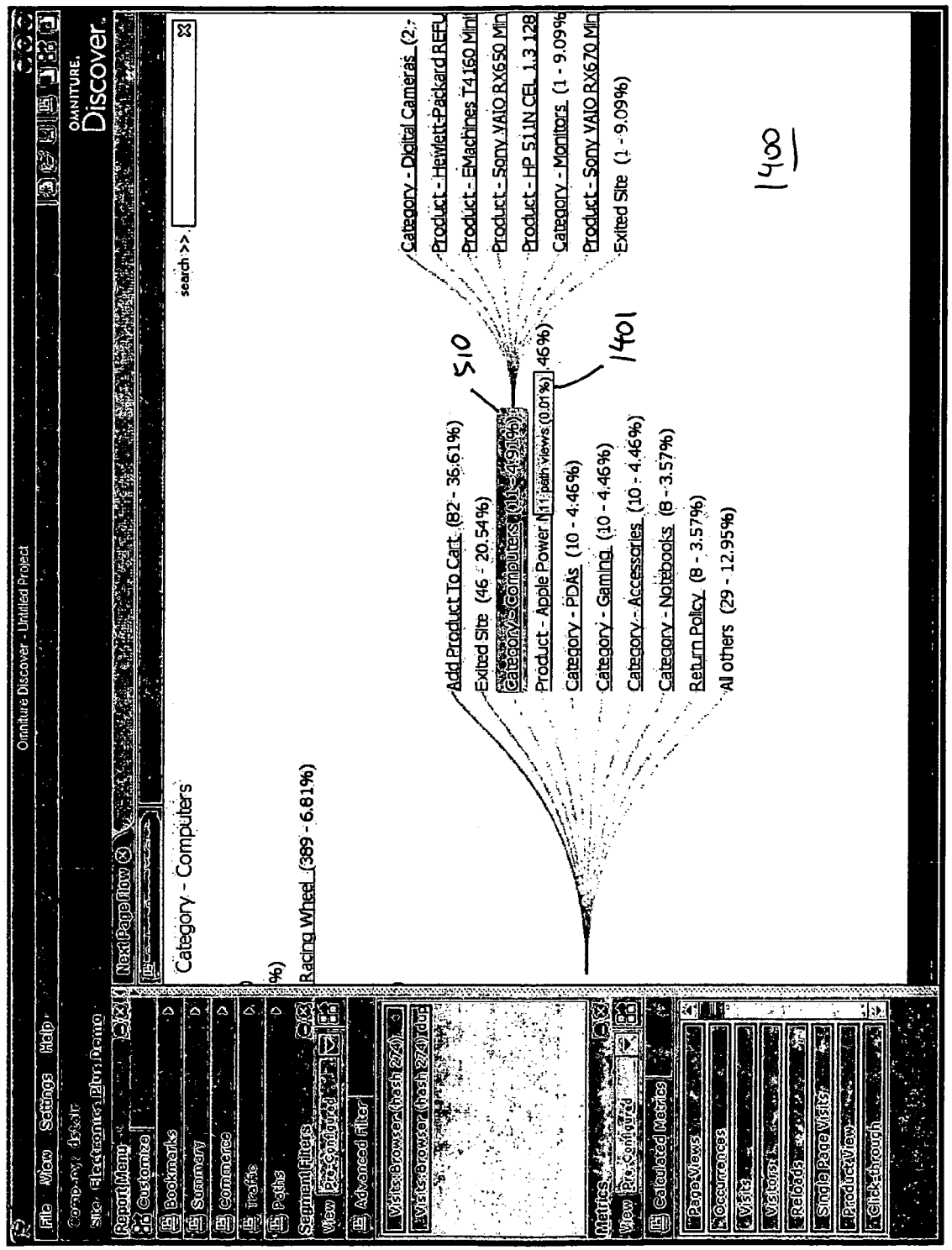
FIG. 14 is an example of a Next Page Flow screen including tooltip functionality, according to one embodiment of the present invention.
Figure 15:
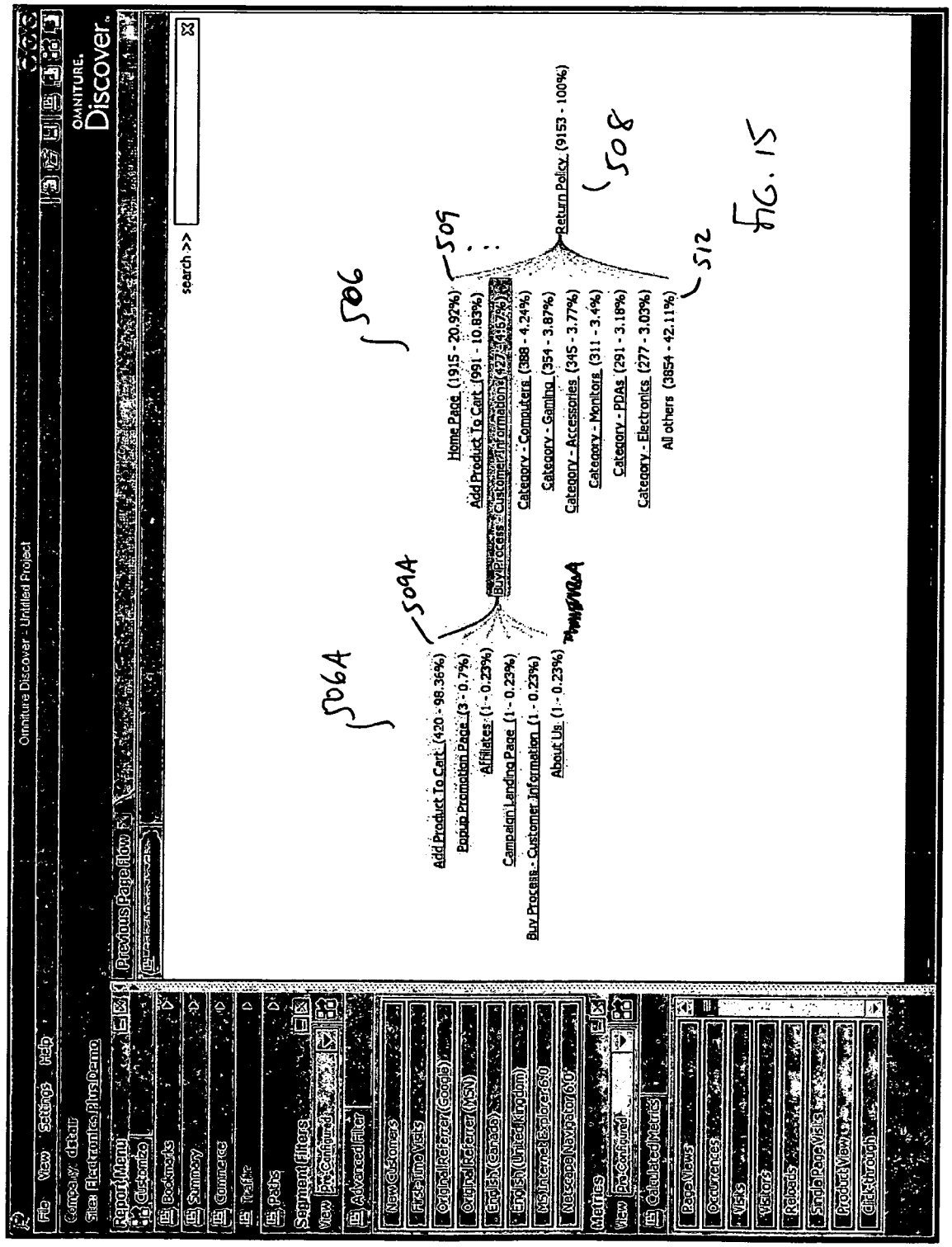
FIG. 15 is an example of a Previous Page Flow screen according to one embodiment of the present invention.

In one embodiment, additional information about a page 510 can be shown in response to the user causing a cursor to hover over the page 510, for example in a Tooltip. An example is shown in FIG. 14, where Tooltip 1401 is shown in response to the user causing a cursor (not shown) to hover over Category-Computers page 510 link. Tooltip 1401 is dismissed when the cursor is moved off the link. Tooltip 1401 can contain similar information to that described above in connection with Tooltip 561 of FIG. 5C, or it can contain different information.

For clarity and for illustrative purposes, FIGS. 9 through 14 depict Next Page flow only. However, one skilled in the art will recognize that analogous displays for Previous Page Flows can be shown. An example is presented in FIG. 15, where screen 1500 includes a two-level Previous Page Flow display. Previous Pages column 506 shows a list of pages 510 that were visited immediately before the path, i.e. immediately before starting page 508. Column 506A shows path visitation statistics for those paths that included at least one page preceding both Buy Process-Customer Information page 509 and starting page 508 in that order. Also shown is an All Others entry 512 representing paths that starting from a page not listed in column 506 and continued to starting page 508.

In addition, the Next Page Flow and Previous Page Flow displays can be combined into a single display with starting page 508 in the middle.

Figure 16:
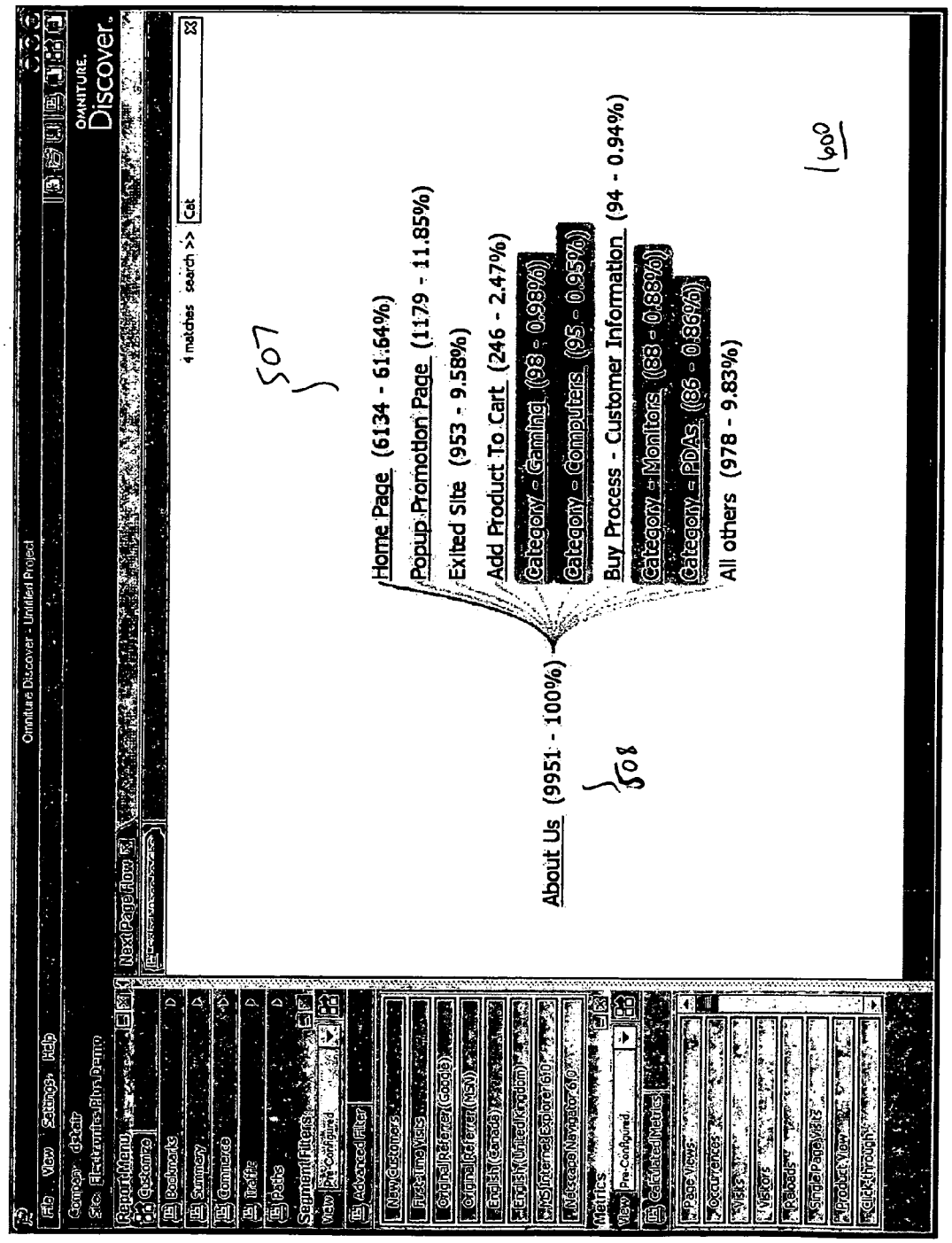
FIG. 16 is an example of a Next Page Flow screen including dynamic search functionality according to one embodiment of the present invention.

Referring now to FIG. 16, there is shown a screen 1600 depicting dynamic search functionality. The user can zero in on particular pages 510 of interest by typing a query in search field 1601. The listed pages 510 that contain matching text in their titles are highlighted.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer, network of computers, or other apparatus. Various general-purpose systems may be used with programs in accordance with the teachings herein, or it may prove convenient to construct a more specialized apparatus to perform the required method steps. The required structure for a variety of these systems appears from the description. In addition, the present invention is not described with reference to any particular programming language. It will be appreciated that a variety of programming languages may be used to implement the teachings of the invention as described herein.

As will be understood by those familiar with the art, the invention may be embodied in other specific forms without departing from the spirit or essential characteristics thereof. For example, the particular architectures depicted above are merely exemplary of one implementation of the present invention. The functional elements and method steps described above are provided as illustrative examples of one technique for implementing the invention; one skilled in the art will recognize that many other implementations are possible without departing from the present invention as recited in the claims. Likewise, the particular capitalization or naming of the modules, protocols, features, attributes, or any other aspect is not mandatory or significant, and the mechanisms that implement the invention or its features may have different names or formats. In addition, the present invention may be implemented as a method, process, user interface, computer program product, system, apparatus, or any combination thereof. Accordingly, the disclosure of the present invention is intended to be illustrative, but not limiting, of the scope of the invention, which is set forth in the following claims.

What is claimed is:

1. A method of displaying a dynamic path flow report, comprising:
   in a first display area, displaying a representation of a first path comprising at least two pages in a defined sequence;
   displaying a representation of at least one of a next page and a previous page with respect to the first path, wherein:
     each previous page representation is displayed in a second display area and comprises a page visitation statistic indicating how many site visitation paths included a visit to the previous page prior to a traversal of the pages of the first path in the defined sequence; and
     each next page representation is displayed in a third display area and comprises a page visitation statistic indicating how many site visitation paths included a visit to the next page after a traversal of the pages of the first path in the defined sequence;
   receiving user selection of at least one displayed page representation in at least one of the second and third display areas; and
   responsive to the user selection:

adding a page corresponding to each user-selected page representation to the first path;

in the first display area, displaying an updated representation of the first path, the updated representation comprising a representation of the added page; and repeating the step of displaying a representation of at least one of a next page and a previous page with respect to the first path.

2. The method of claim 1, wherein displaying a representation of at least one of a next page and a previous page with respect to the first path comprises:

displaying a representation of at least one next page with respect to the first path; and displaying a representation of at least one previous page with respect to the first path.

3. The method of claim 1, further comprising displaying a representation of the first path comprising the at least two pages in the defined sequence and the page corresponding to each user-selected page.

4. The method of claim 1, wherein:

each page visitation statistic for a previous page indicates how many site visitation paths included a visit to the previous page followed consecutively by a traversal of the first path; and each page visitation statistic for a next page indicates how many site visitation paths included a traversal of the first path followed consecutively by a visit to the next page.

5. The method of claim 1, wherein:

each page visitation statistic for a previous page representation comprises a cardinal number indicating a quantity of site visitation paths that included a visit to the previous page prior to a traversal of the pages of the first path in the defined sequence; and each page visitation statistic for a next page representation comprises a cardinal number indicating a quantity of site visitation paths that included a visit to the next page after a traversal of the pages of the first path in the defined sequence.

6. The method of claim 1, wherein:

each page visitation statistic for a previous page representation indicates a percentage of site visitation paths that included a visit to the previous page prior to a traversal of the pages of the first path in the defined sequence, among site visitation paths that included a traversal of the first path; and each page visitation statistic for a next page representation indicates a percentage of site visitation paths that included a visit to the previous page after a traversal of the pages of the first path in the defined sequence, among site visitation paths that included a traversal of the first path.

7. The method of claim 1, wherein at least one user-selected page representation corresponds to a previous page, and wherein adding a page corresponding to each user-selected page representation to the first path comprises, for at least one user-selected page representation, adding the page corresponding to the user-selected page representation to the beginning of the first path.

8. The method of claim 1, wherein at least one user-selected page representation corresponds to a next page, and wherein adding a page corresponding to each user-selected page representation to the first path comprises, for at least one user-selected page representation, adding the page corresponding to the user-selected page representation to the end of the first path.

9. The method of claim 1, further comprising:

receiving user input requesting additional information about a page corresponding to a page representation; and responsive to the user input, displaying additional information about the page.

10. The method of claim 9, wherein:

receiving user input requesting additional information comprises receiving user input causing a cursor to hover over a page representation; and displaying additional information comprises displaying additional information in a tooltip.

11. The method of claim 1, further comprising:

displaying at least one link corresponding to a previous state of the report; and responsive to user input selecting a link corresponding to a previous state of the report, restoring the report to the corresponding previous state.

12. A computer program product for displaying a dynamic path flow report, comprising:

a computer-readable medium; and computer program code, encoded on the medium, for:

in a first display area, displaying a representation of a first path comprising at least two pages in a defined sequence;

displaying a representation of at least one of a next page and a previous page with respect to the first path, wherein:

each previous page representation is displayed in a second display area and comprises a page visitation statistic indicating how many site visitation paths included a visit to the previous page prior to a traversal of the pages of the first path in the defined sequence; and each next page representation is displayed in a third display area and comprises a page visitation statistic indicating how many site visitation paths included a visit to the next page after a traversal of the pages of the first path in the defined sequence;

receiving user selection of at least one displayed page representation in at least one of the second and third display areas; and responsive to the user selection:

adding a page corresponding to each user-selected page representation to the first path;

the first display area, displaying an updated representation of the first path, the updated representation comprising a representation of the added page; and repeating the step of displaying a representation of at least one of a next page and a previous page with respect to the first path.

13. The computer program product of claim 12, wherein the computer program code for displaying a representation of at least one of a next page and a previous page with respect to the first path comprises computer program code for:

displaying a representation of at least one next page with respect to the first path; and displaying a representation of at least one previous page with respect to the first path.

14. The computer program product of claim 12, further comprising computer program code for displaying a representation of the first path comprising the at least two pages in the defined sequence and the page corresponding to each user-selected page.

15. The computer program product of claim 12, wherein:

each page visitation statistic for a previous page indicates how many site visitation paths included a visit to the previous page followed consecutively by a traversal of the first path; and each page visitation statistic for a next page indicates how many site visitation paths included a traversal of the first path followed consecutively by a visit to the next page.

16. The computer program product of claim 12, wherein: each page visitation statistic for a previous page representation comprises a cardinal number indicating a quantity of site visitation paths that included a visit to the previous page prior to a traversal of the pages of the first path in the defined sequence; and each page visitation statistic for a next page representation comprises a cardinal number indicating a quantity of site visitation paths that included a visit to the next page after a traversal of the pages of the first path in the defined sequence.

17. The computer program product of claim 12, wherein: each page visitation statistic for a previous page representation indicates a percentage of site visitation paths that included a visit to the previous page prior to a traversal of the pages of the first path in the defined sequence, among site visitation paths that included a traversal of the first path; and each page visitation statistic for a next page representation indicates a percentage of site visitation paths that included a visit to the previous page after a traversal of the pages of the first path in the defined sequence, among site visitation paths that included a traversal of the first path.

18. The computer program product of claim 12, wherein the user-selected page representation corresponds to a previous page, and wherein the computer program code for adding a page corresponding to each user-selected page representation to the first path comprises computer program code for, for at least one user-selected page representation, adding the page corresponding to the user-selected page representation to the beginning of the first path.

19. The computer program product of claim 12, wherein the user-selected page representation corresponds to a next page, and wherein the computer program code for adding a page corresponding to each user-selected page representation to the first path comprises computer program code for, for at least one user-selected page representation, adding the page corresponding to the user-selected page representation page to the end of the first path.

20. The computer program product of claim 12, further comprising computer program code for:
receiving user input requesting additional information about a page corresponding to a page representation; and
responsive to the user input, displaying additional information about the page.

21. The computer program product of claim 20, wherein: the computer program code for receiving user input requesting additional information comprises computer program code for receiving user input causing a cursor to hover over a page representation; and
the computer program code for displaying additional information comprises computer program code for displaying additional information in a tooltip.

22. The computer program product of claim 12, further comprising computer program code for:

displaying at least one link corresponding to a previous state of the report; and
responsive to user input selecting a link corresponding to a previous state of the report, restoring the report to the corresponding previous state.

23. A system of displaying a dynamic path flow report, comprising:
an output device, for:
in a first display area, displaying a representation of a first path comprising at least two pages in a defined sequence;
and for displaying a representation of at least one of a next page and a previous page with respect to the first path, wherein:
each previous page representation is displayed in a second display area and comprises a page visitation statistic indicating how many site visitation paths included a visit to the previous page prior to a traversal of the pages of the first path in the defined sequence; and
each next page representation is displayed in a third display area and comprises a page visitation statistic indicating how many site visitation paths included a visit to the next page after a traversal of the pages of the first path in the defined sequence; and
an input device, for receiving user selection of at least one displayed page representation in at least one of the second and third display areas;
wherein, responsive to the user selection, the output device:
adds a page corresponding to each user-selected page representation to the first path;
in the first display area, displays an updated representation of the first path, the updated representation comprising a representation of the added page; and
repeats the step of displaying a representation of at least one of a next page and a previous page with respect to the first path.

24. The system of claim 23, wherein:
the output device displays at least one link corresponding to a previous state of the report; and
responsive to the input device detecting user input selecting a link corresponding to a previous state of the report, the output device restores the report to the corresponding previous state.

25. The method of claim 1, wherein:
the first display area comprises a first column;
the second display area comprises a second column; and
the third display area comprises a third column.

26. The computer program product of claim 12, wherein:
the first display area comprises a first column;
the second display area comprises a second column; and
the third display area comprises a third column.

27. The system of claim 23, wherein:
the first display area comprises a first column;
the second display area comprises a second column; and
the third display area comprises a third column.

* * * * *

UNITED STATES PATENT AND TRADEMARK OFFICE
CERTIFICATE OF CORRECTION

PATENT NO. : 7,644,375 B1 Page 1 of 1
APPLICATION NO. : 11/523783
DATED : January 5, 2010
INVENTOR(S) : Joel Anderson, David Stair and Catherine Jen Wong It is certified that error appears in the above-identified patent and that said Letters Patent is hereby corrected as shown below:

In the Claims:

Claim 12, col. 14, line 43, before "the first display area", please insert --in--.

Claim 17, col. 15, line 23, please delete "previous" and insert --next-- in place thereof.

Claim 19, col. 15, lines 42-43, after "page representation", please delete "page".

Signed and Sealed this

Twenty-seventh Day of July, 2010

David J. Kappos
*Director of the United States Patent and Trademark Office*